US00RE45934E

(19) United States
(12) Reissued Patent
Kent et al.

(10) Patent Number: US RE45,934 E
(45) Date of Reissued Patent: Mar. 22, 2016

(54) FIREBOX

(71) Applicant: Greenway Home Products Ltd., Guelph (CA)

(72) Inventors: Jason Kent, Guelph (CA); Douglas G. Greenway, Guelph (CA)

(73) Assignee: Greenway Home Products, Ltd., Guelph

(21) Appl. No.: 29/462,876

(22) Filed: Aug. 9, 2013

Related U.S. Patent Documents

Reissue of:
(64) Patent No.: Des. 671,200
Issued: Nov. 20, 2012
Appl. No.: 29/395,224
Filed: Dec. 20, 2011

(51) LOC (10) Cl. ..... 23-03
(52) U.S. Cl.
USPC ..... D23/343
(58) Field of Classification Search
USPC ..... D23/336, 341, 342, 343, 344, 345, 347, D23/349, 351, 355, 364, 370, 378, 381, D23/403–410, 415–422, 499; D7/332, 402, D7/407, 417; D15/144; 126/91 R, 92 AC, 126/92 B, 200, 201, 258, 298, 500, 512, 126/540, 543, 544, 548, 555, 547; 40/428, 40/798; 44/520, 530; 52/36.3; 160/DIG. 9; 219/549; 431/263, 273, 329
See application file for complete search history.

(56) References Cited

U.S. PATENT DOCUMENTS

| | | | | | |
|---|---|---|---|---|---|
| D264,497 | S | * | 5/1982 | Morande, Jr. | D23/344 |
| D301,610 | S | * | 6/1989 | Craver | D23/344 |
| 5,626,127 | A | * | 5/1997 | Maitland et al. | 126/523 |
| D390,936 | S | * | 2/1998 | French et al. | D23/350 |
| 5,775,408 | A | * | 7/1998 | Shimek et al. | 165/48.1 |
| D591,409 | S | * | 4/2009 | Kashimoto | D23/351 |
| D591,410 | S | * | 4/2009 | Kashimoto | D23/351 |
| 7,726,299 | B2 | * | 6/2010 | Reyher | 126/512 |
| D638,922 | S | * | 5/2011 | Zhou | D23/344 |
| D658,750 | S | * | 5/2012 | Nemes | D23/344 |
| D664,634 | S | * | 7/2012 | Kent et al. | D23/343 |
| D668,325 | S | * | 10/2012 | Kent et al. | D23/343 |
| D671,200 | S | * | 11/2012 | Kent et al. | D23/343 |
| D693,918 | S | * | 11/2013 | Whalen | D23/405 |
| D694,873 | S | * | 12/2013 | Nemes et al. | D23/405 |
| 2005/0000511 | A1 | * | 1/2005 | McDonald | 126/523 |

* cited by examiner

*Primary Examiner* — Philip S Hyder
*Assistant Examiner* — Darlington Ly

(57) CLAIM

The ornamental design for a firebox, as shown and described.

DESCRIPTION

FIG. 1 is a front perspective view of the firebox.
FIG. 2 is a back perspective view of the firebox.
FIG. 3 is a front [plan] *elevation* view of the firebox.
FIG. 4 is a back [plan] *elevation* view of the firebox.
FIG. 5 is a right [plan] *elevation* view of the firebox.
FIG. 6 is a left [plan] *elevation* view of the firebox.
FIG. 7 is a top [plan] *elevation* view of the firebox.
FIG. 8 is a bottom [plan] *elevation* view of the firebox.
In accordance with a second variant of the present design:
FIG. 9 is a front perspective view of the firebox.
FIG. 10 is a back perspective view of the firebox.
FIG. 11 is a front [plan] *elevation* view of the firebox.
FIG. 12 is a back [plan] *elevation* view of the firebox.
FIG. 13 is a right [plan] *elevation* view of the firebox.
FIG. 14 is a left [plan] *elevation* view of the firebox.
FIG. 15 is a top [plan] *elevation* view of the firebox.
FIG. 16 is a bottom [plan] *elevation* view of the firebox.
In accordance with a third variant of the present design:
FIG. 17 is a front perspective view of the firebox.
FIG. 18 is a back perspective view of the firebox.
FIG. 19 is a front [plan] *elevation* view of the firebox.
FIG. 20 is a back [plan] *elevation* view of the firebox.
FIG. 21 is a right [plan] *elevation* view of the firebox.
FIG. 22 is a left [plan] *elevation* view of the firebox.
FIG. 23 is a top [plan] *elevation* view of the firebox.
FIG. 24 is a bottom [plan] *elevation* view of the firebox.

In accordance with a fourth variant of the present design:
FIG. 25 is a front perspective view of the firebox.
FIG. 26 is a back perspective view of the firebox.
FIG. 27 is a front [plan] *elevation* view of the firebox.
FIG. 28 is a back [plan] *elevation* view of the firebox.
FIG. 29 is a right [plan] *elevation* view of the firebox.
FIG. 30 is a left [plan] *elevation* view of the firebox.
FIG. 31 is a top [plan] *elevation* view of the firebox.
FIG. 32 is a bottom [plan] *elevation* view of the firebox.
In accordance with a fifth variant of the present design:
FIG. 33 is a front perspective view of the firebox.
FIG. 34 is a back perspective view of the firebox.
FIG. 35 is a front [plan] *elevation* view of the firebox.
FIG. 36 is a back [plan] *elevation* view of the firebox.
FIG. 37 is a right [plan] *elevation* view of the firebox.
FIG. 38 is a left [plan] *elevation* view of the firebox.
FIG. 39 is a top [plan] *elevation* view of the firebox.
FIG. 40 is a bottom [plan] *elevation* view of the firebox.
In accordance with a sixth variant of the present design:
FIG. 41 is a front perspective view of the firebox.
FIG. 42 is a back perspective view of the firebox.
FIG. 43 is a front [plan] *elevation* view of the firebox.
FIG. 44 is a back [plan] *elevation* view of the firebox.
FIG. 45 is a right [plan] *elevation* view of the firebox.
FIG. 46 is a left [plan] *elevation* view of the firebox.
FIG. 47 is a top [plan] *elevation* view of the firebox.
FIG. 48 is a bottom [plan] *elevation* view of the firebox.
In accordance with a seventh variant of the present design:
FIG. 49 is a front perspective view of the firebox.
FIG. 50 is a back perspective view of the firebox.
FIG. 51 is a front [plan] *elevation* view of the firebox.
FIG. 52 is a back [plan] *elevation* view of the firebox.
FIG. 53 is a right [plan] *elevation* view of the firebox.
FIG. 54 is a left [plan] *elevation* view of the firebox.
FIG. 55 is a top [plan] *elevation* view of the firebox.
FIG. 56 is a bottom [plan] *elevation* view of the firebox.
In accordance with an eighth variant of the present design:
FIG. 57 is a front perspective view of the firebox.
FIG. 58 is a back perspective view of the firebox.
FIG. 59 is a front [plan] *elevation* view of the firebox.
FIG. 60 is a back [plan] *elevation* view of the firebox.
FIG. 61 is a right [plan] *elevation* view of the firebox.
FIG. 62 is a left [plan] *elevation* view of the firebox.
FIG. 63 is a top [plan] *elevation* view of the firebox.
FIG. 64 is a bottom [plan] *elevation* view of the firebox.
In accordance with a ninth variant of the present design:
FIG. 65 is a front perspective view of the firebox.
FIG. 66 is a back perspective view of the firebox.
FIG. 67 is a front [plan] *elevation* view of the firebox.
FIG. 68 is a back [plan] *elevation* view of the firebox.
FIG. 69 is a right [plan] *elevation* view of the firebox.
FIG. 70 is a left [plan] *elevation* view of the firebox.
FIG. 71 is a top [plan] *elevation* view of the firebox.
FIG. 72 is a bottom [plan] *elevation* view of the firebox.
In accordance with a tenth variant of the present design:
FIG. 73 is a front perspective view of the firebox.
FIG. 74 is a back perspective view of the firebox.
FIG. 75 is a front [plan] *elevation* view of the firebox.
FIG. 76 is a back [plan] *elevation* view of the firebox.
FIG. 77 is a right [plan] *elevation* view of the firebox.
FIG. 78 is a left [plan] *elevation* view of the firebox.
FIG. 79 is a top [plan] *elevation* view of the firebox.
FIG. 80 is a bottom [plan] *elevation* view of the firebox.
[In accordance with a eleventh variant of the present design:
FIG. 81 is a front perspective view of the firebox.
FIG. 82 is a back perspective view of the firebox.
FIG. 83 is a front plan view of the firebox.
FIG. 84 is a back plan view of the firebox.
FIG. 85 is a right plan view of the firebox.
FIG. 86 is a left plan view of the firebox.
FIG. 87 is a top plan view of the firebox; and,
FIG. 88 is a bottom plan view of the firebox.]
The broken [line showing is included for the purpose of illustrating portions of the article and] *lines in the drawings illustrate portions of the firebox that* forms no part of the claimed design.

1 Claim, 80 Drawing Sheets

---

Figure 1:
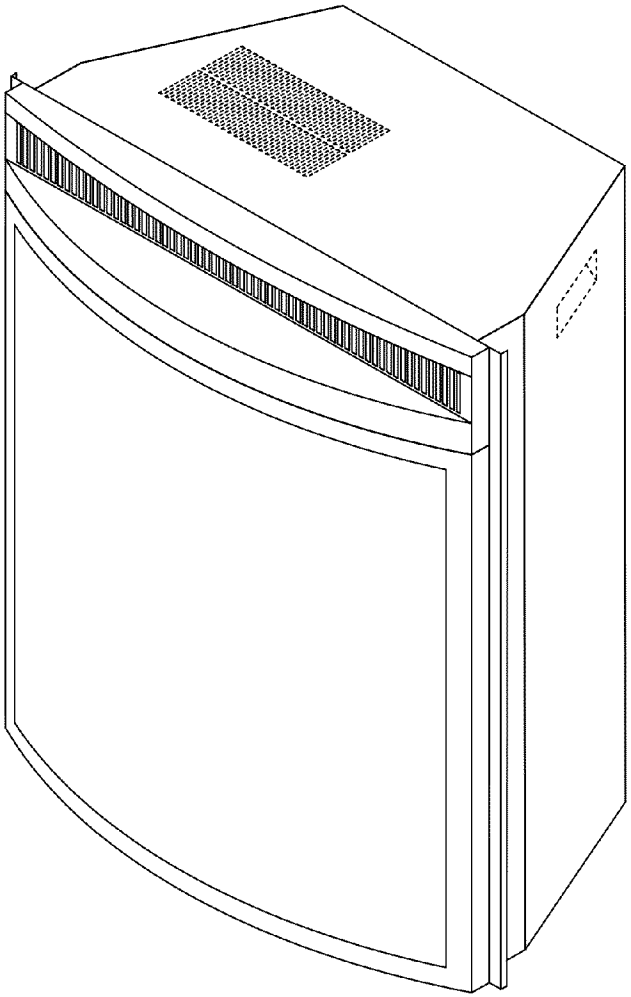
Figure 2:
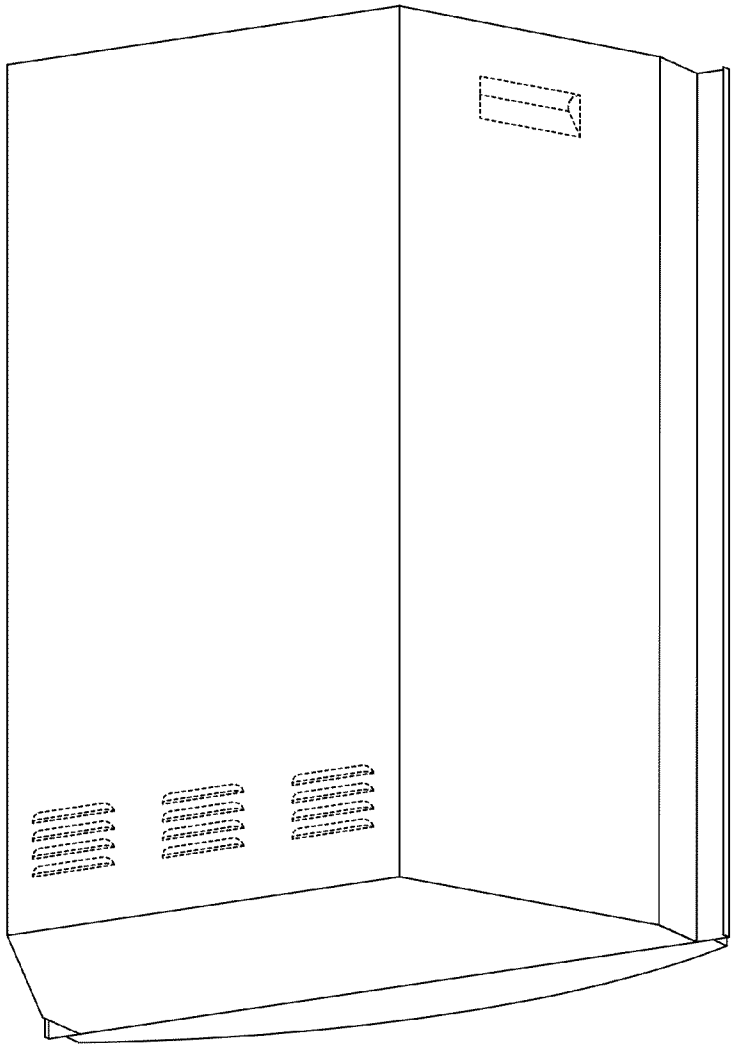
Figure 3:
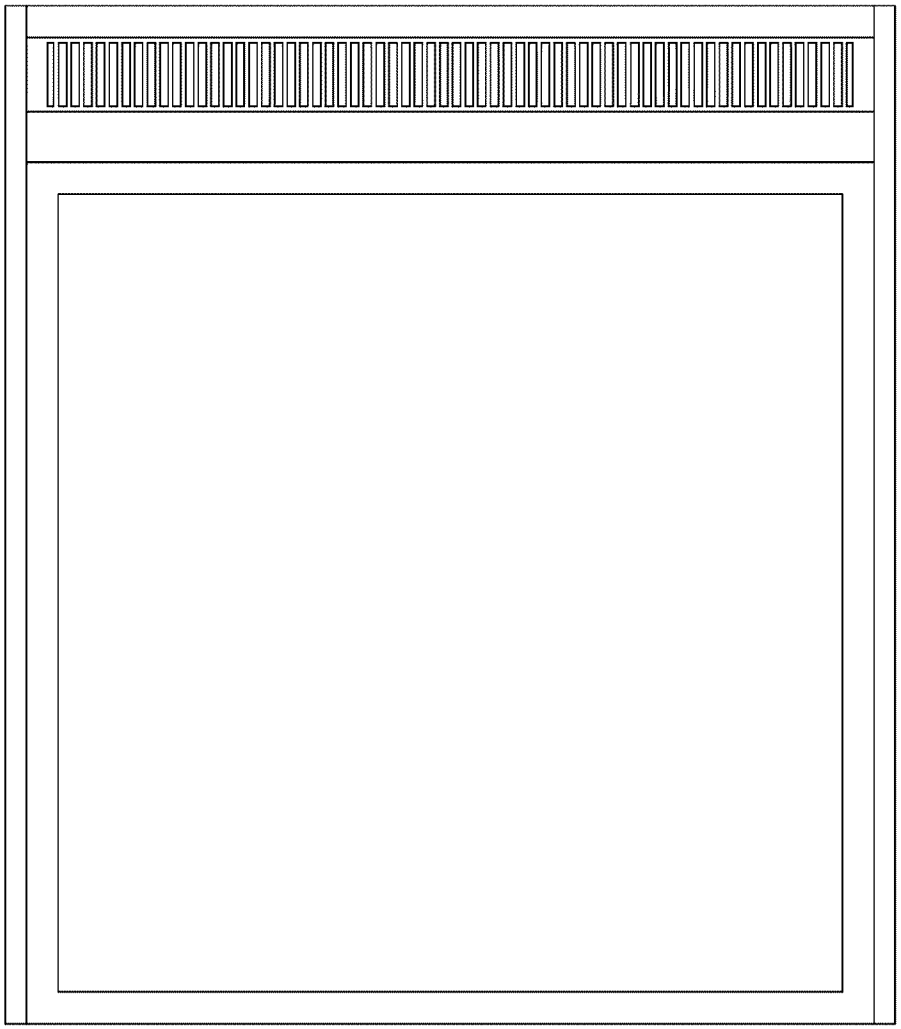
Figure 4:
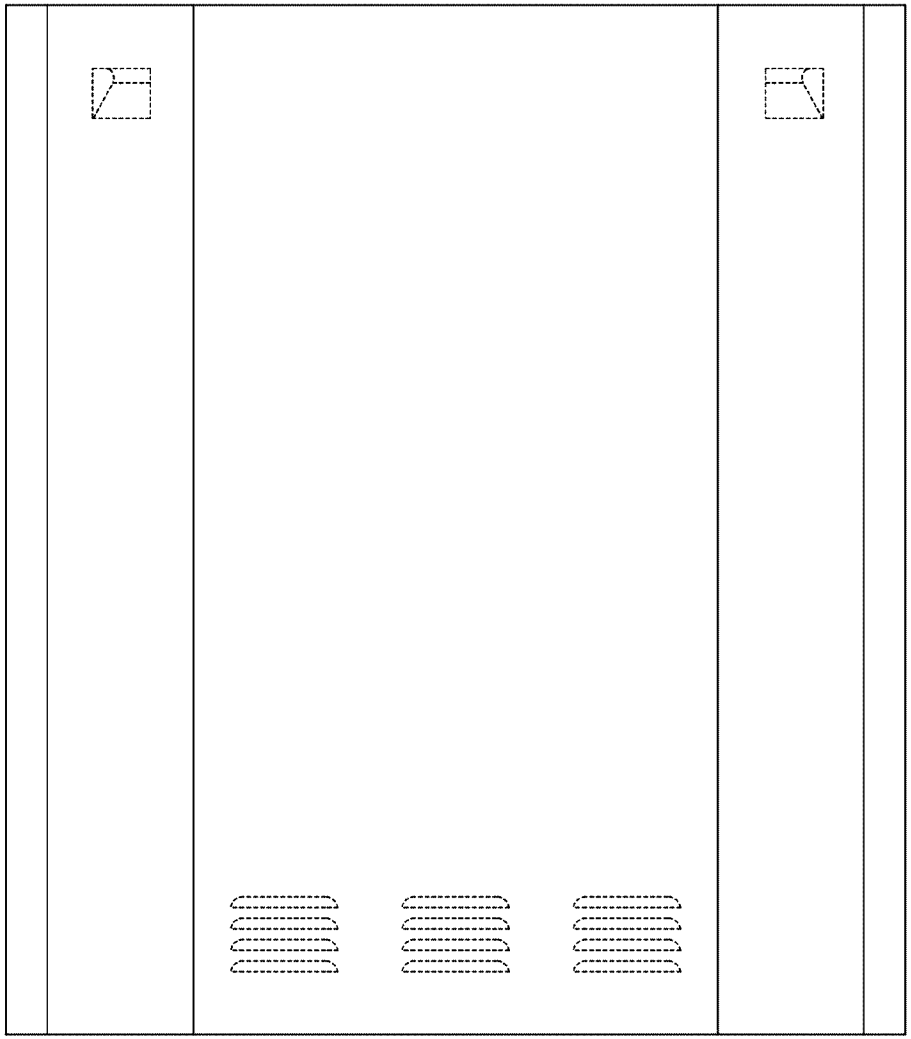
Figure 5:
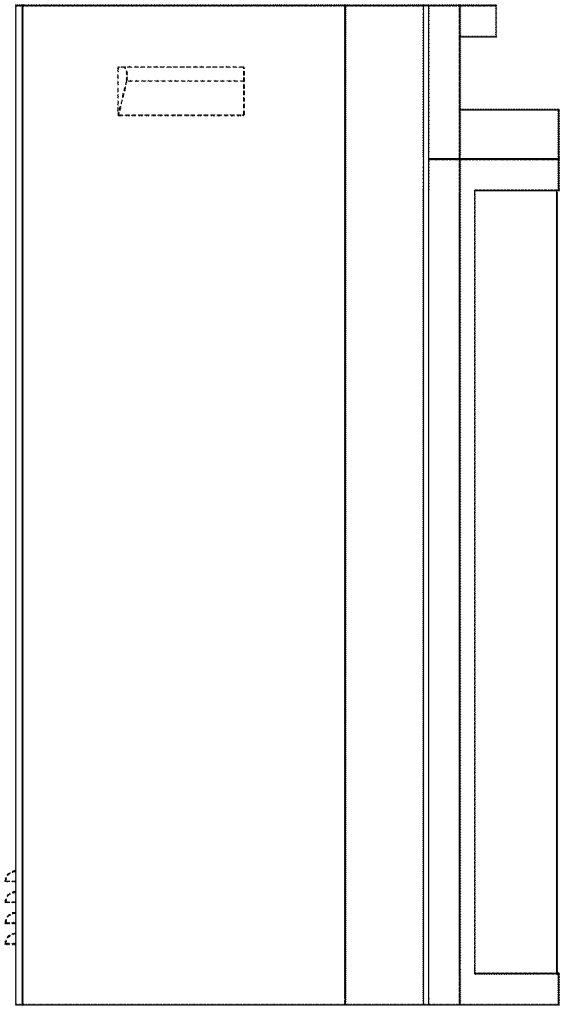
Figure 6:
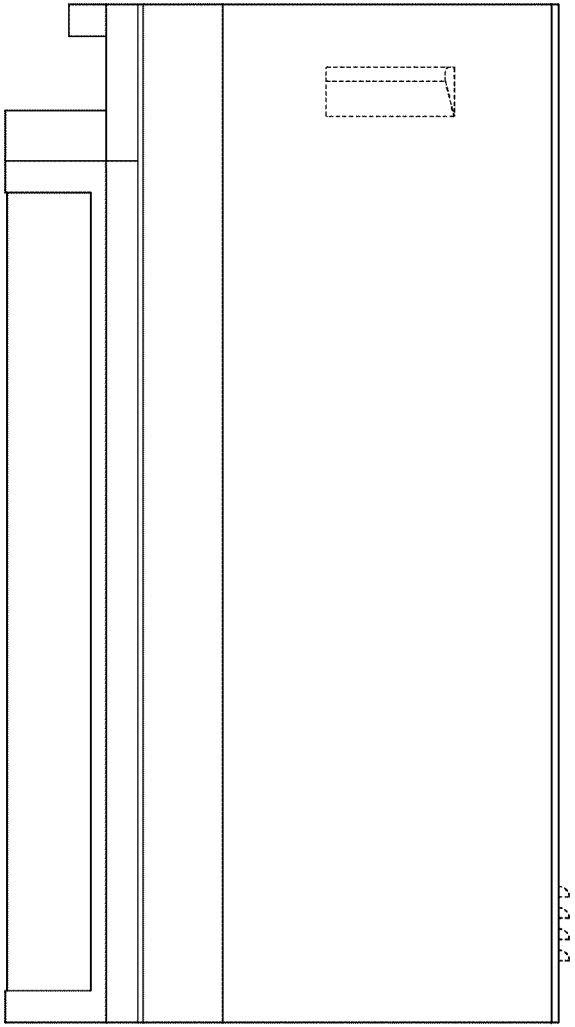
Figure 7:
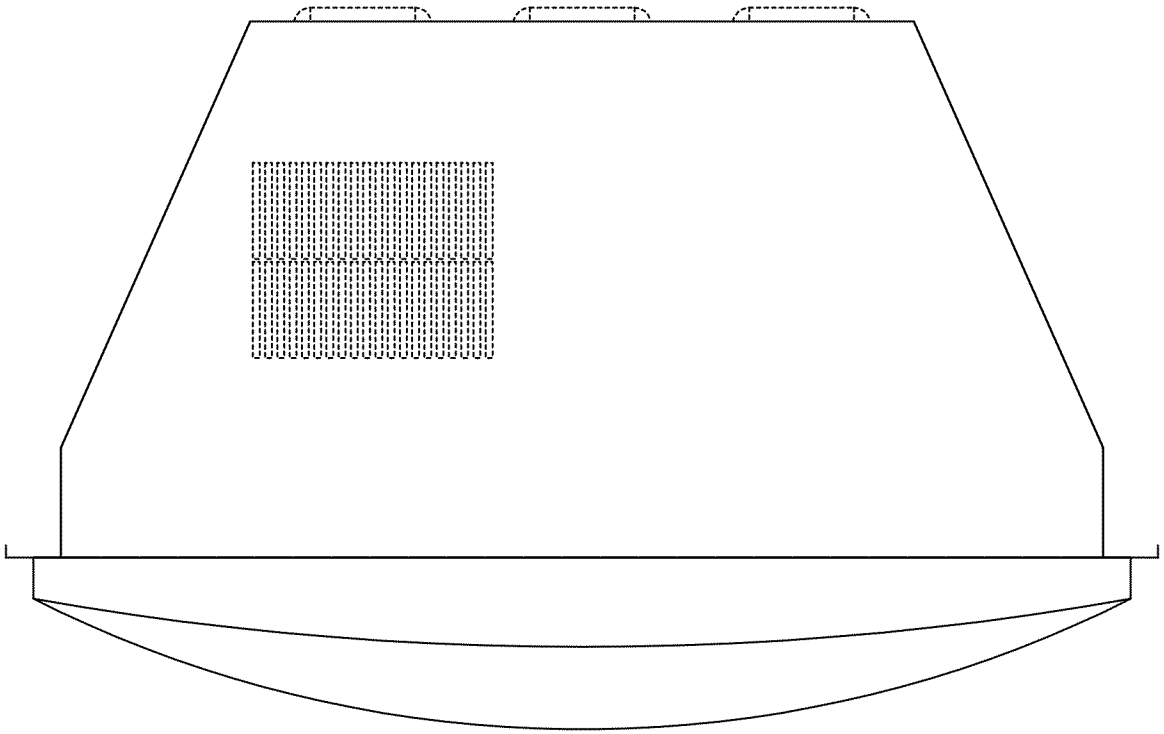
Figure 8:
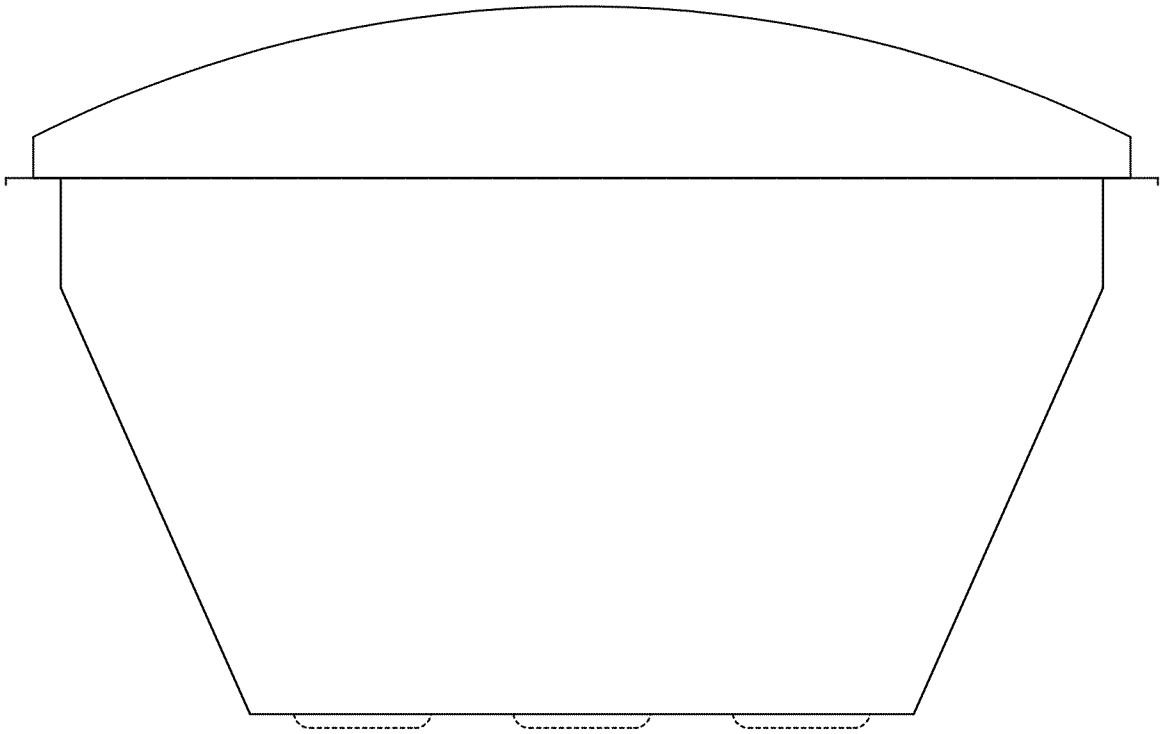
Figure 9:
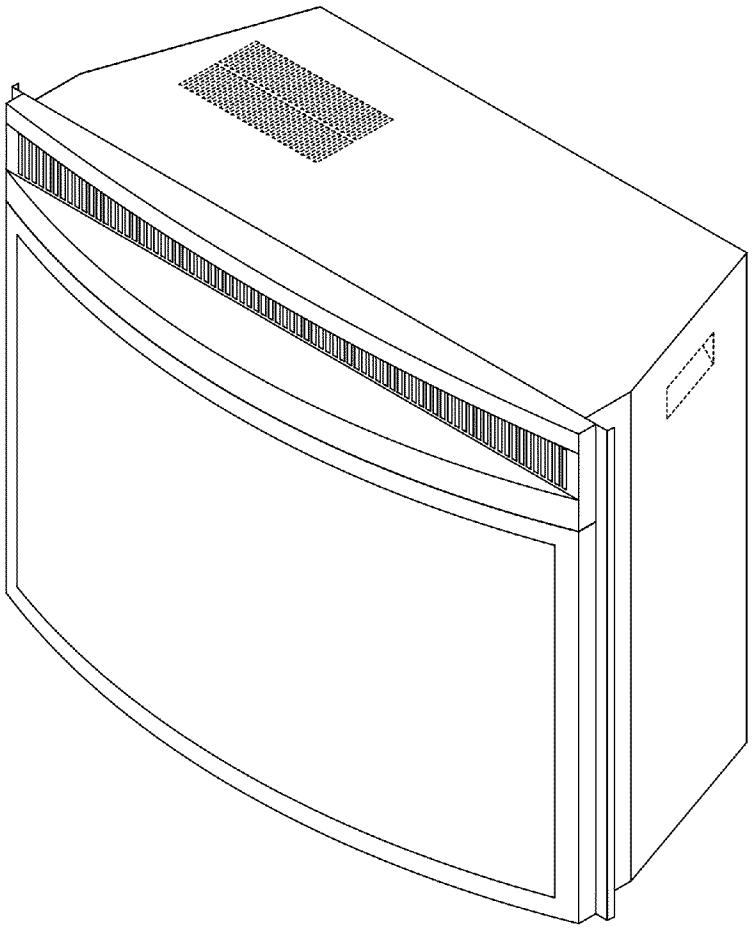
Figure 10:
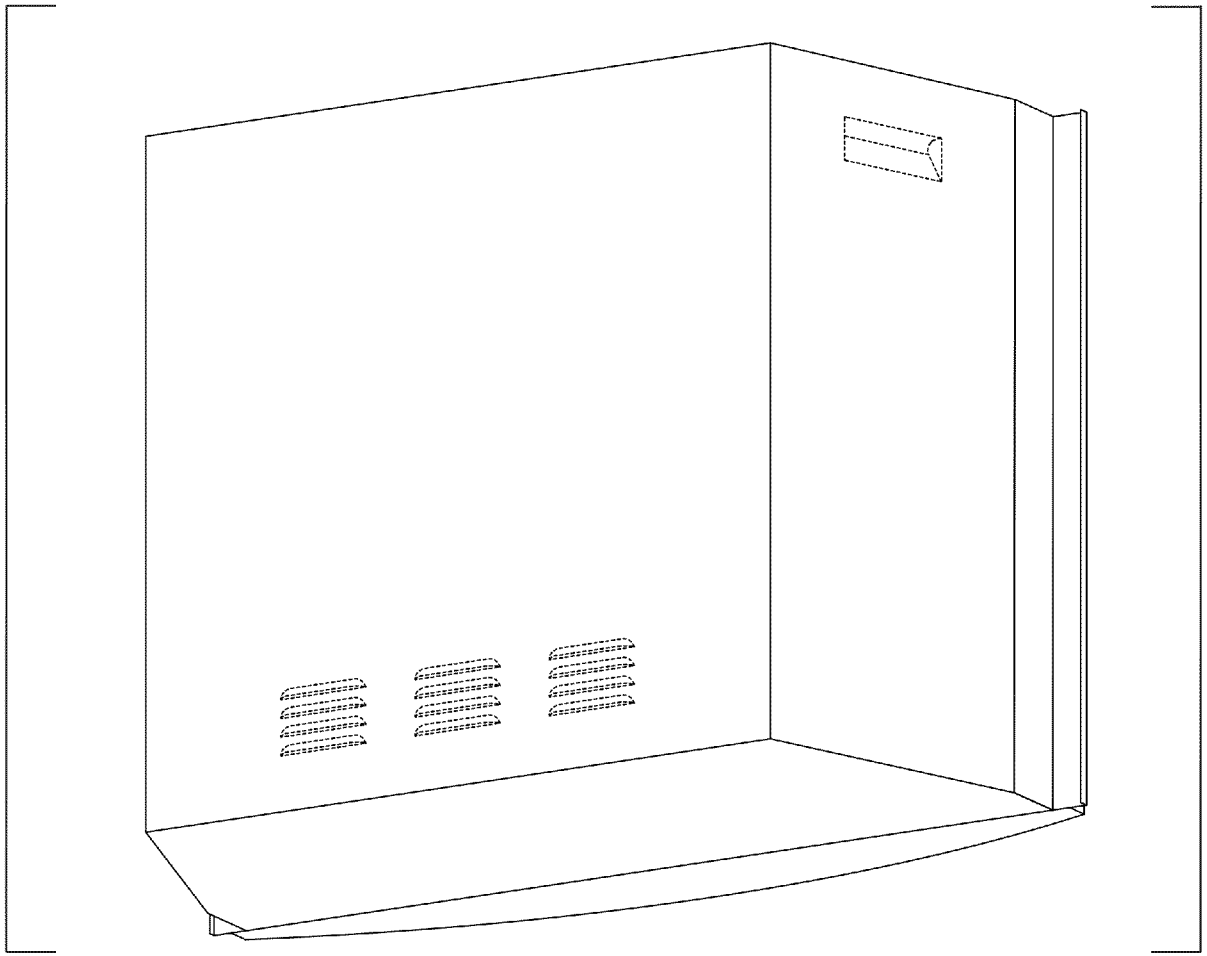
Figure 11:
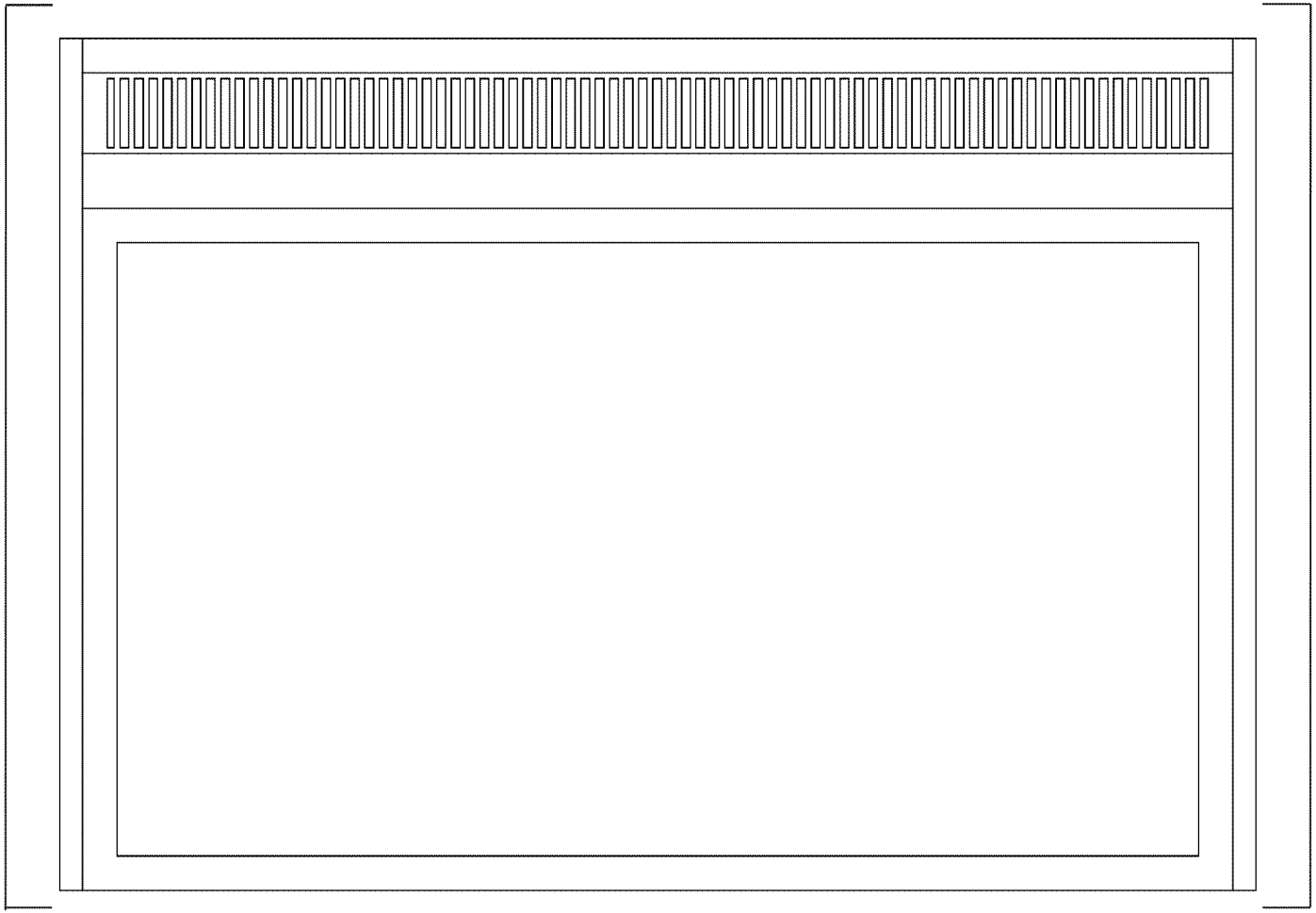
Figure 12:
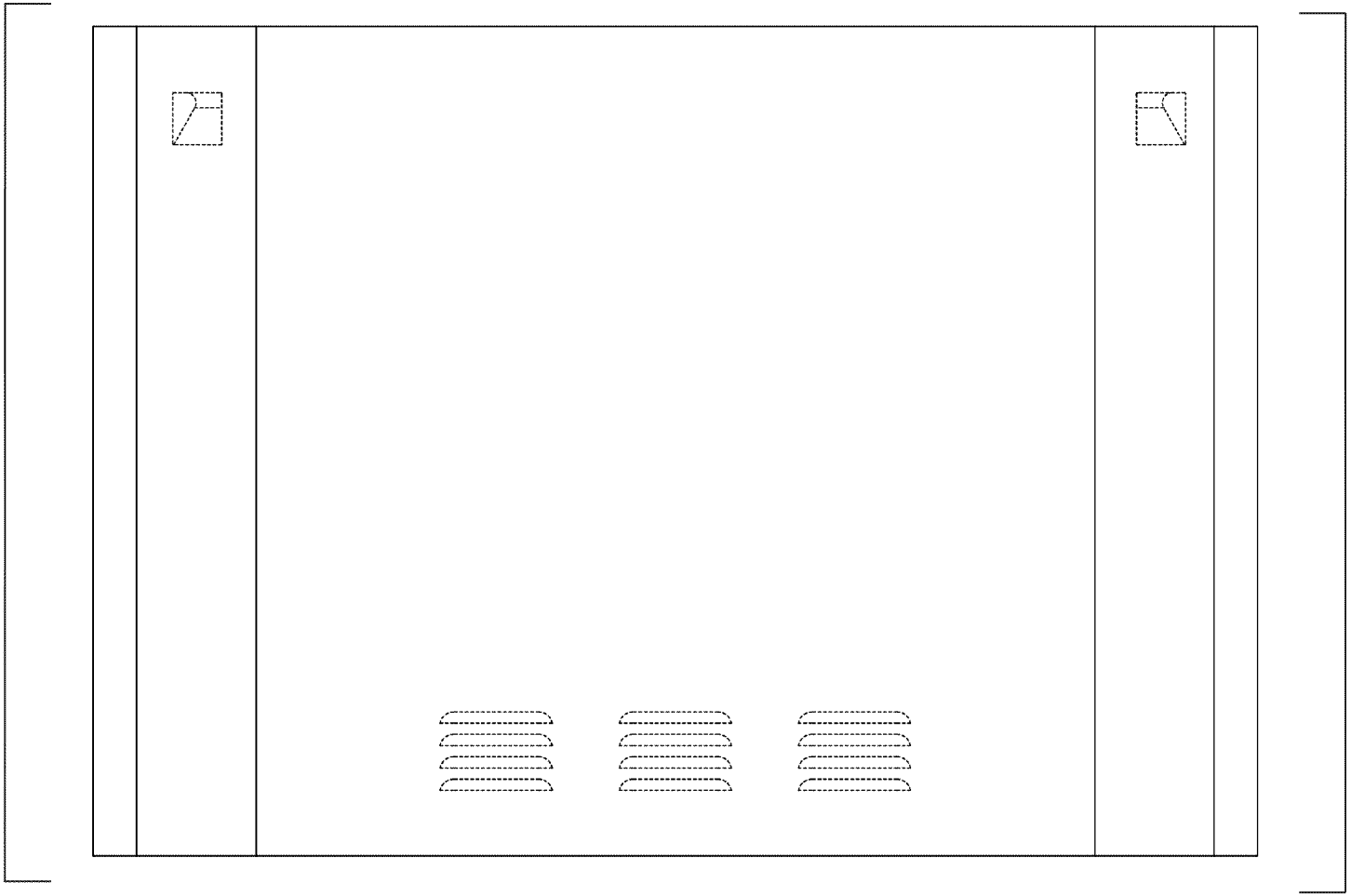
Figure 13:
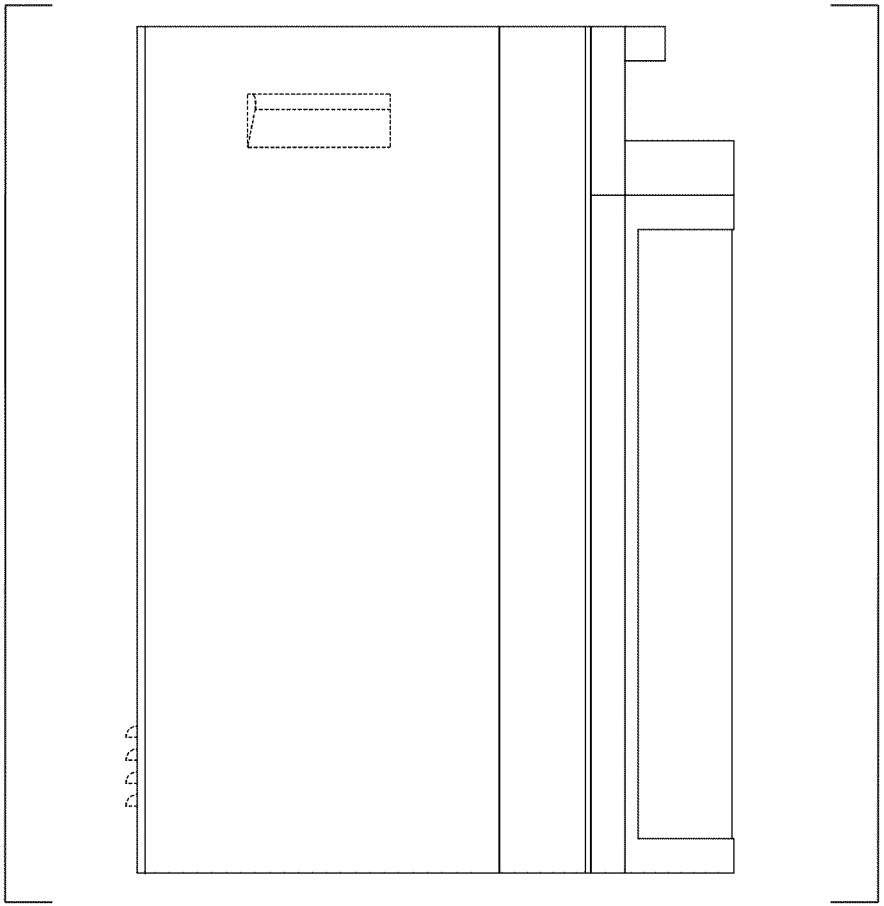
Figure 14:
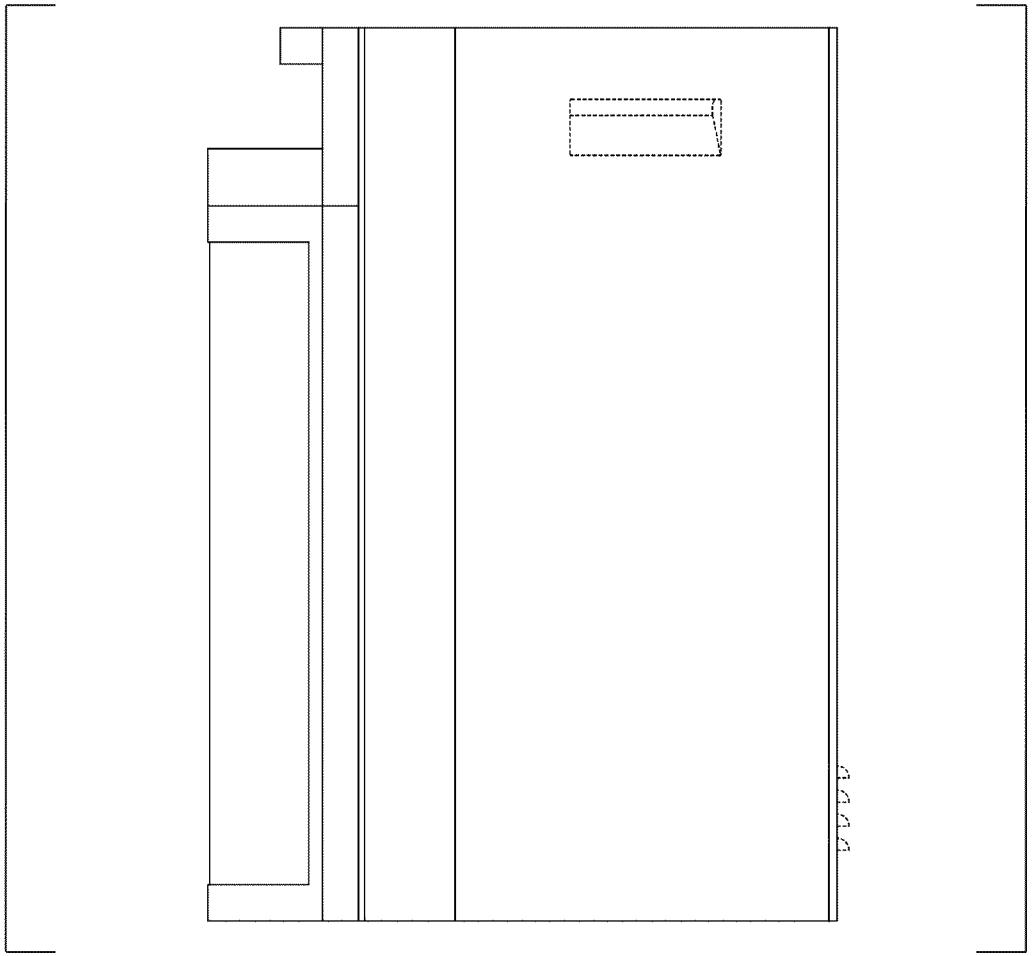
Figure 15:
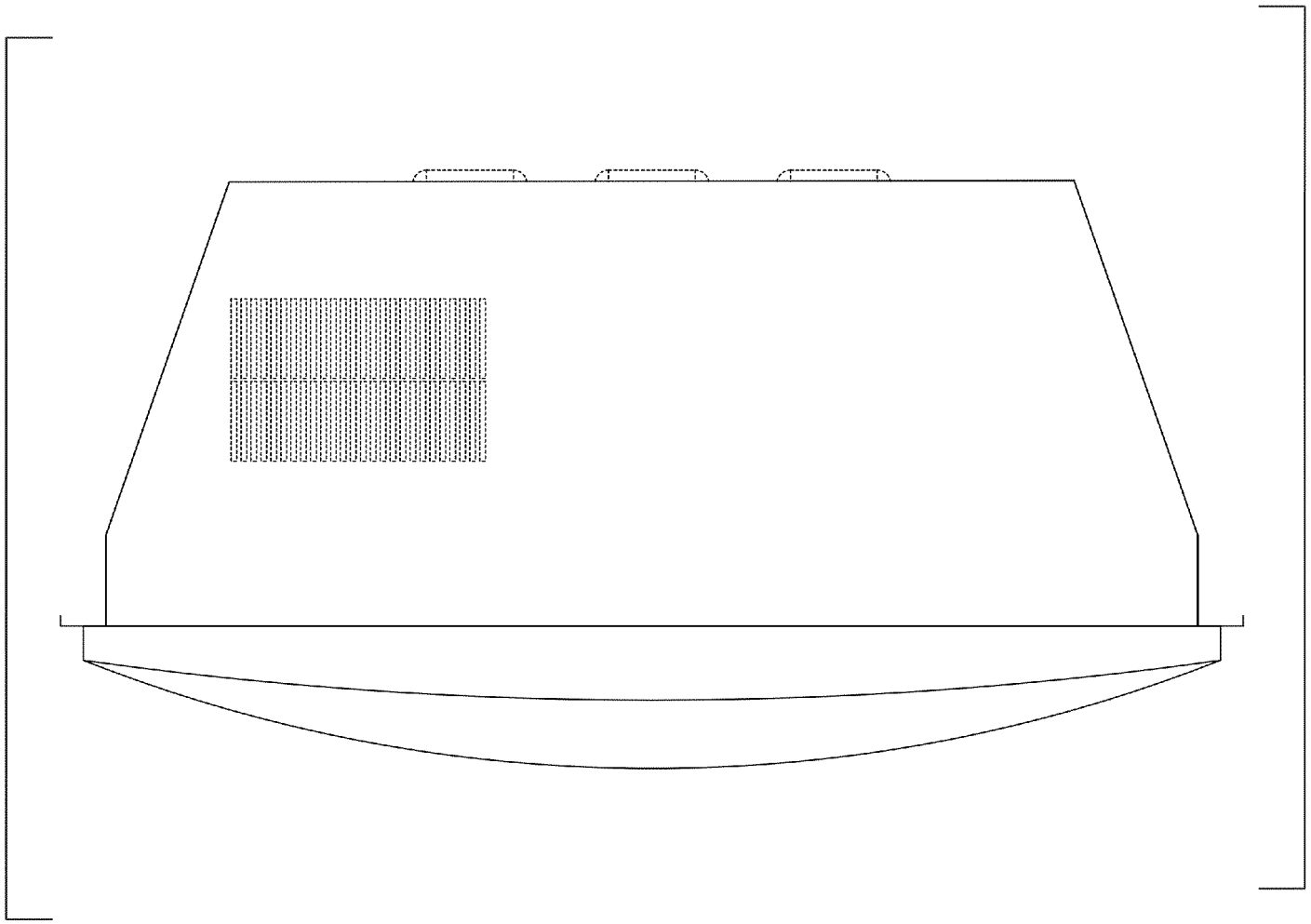
Figure 16:
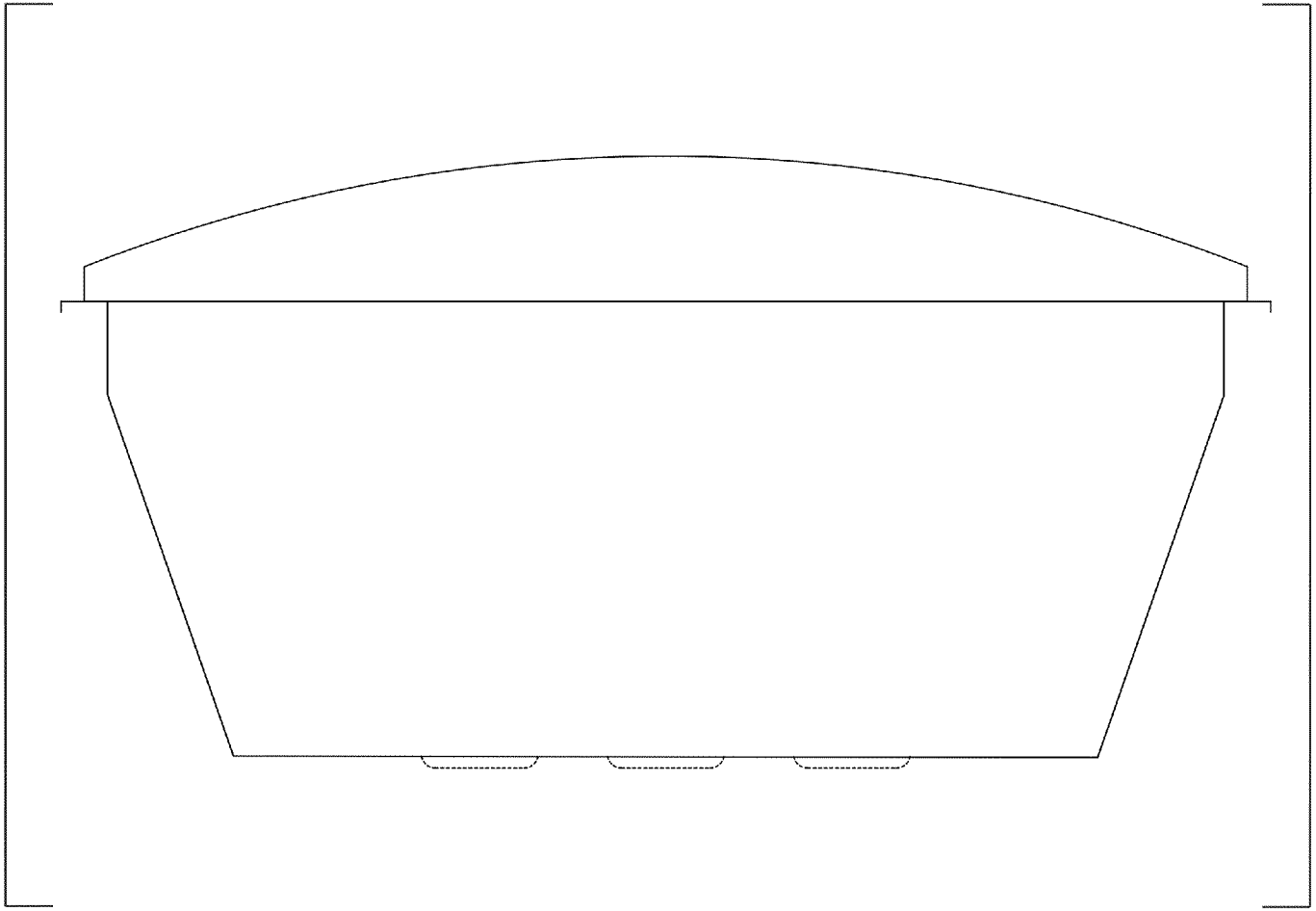
Figure 17:
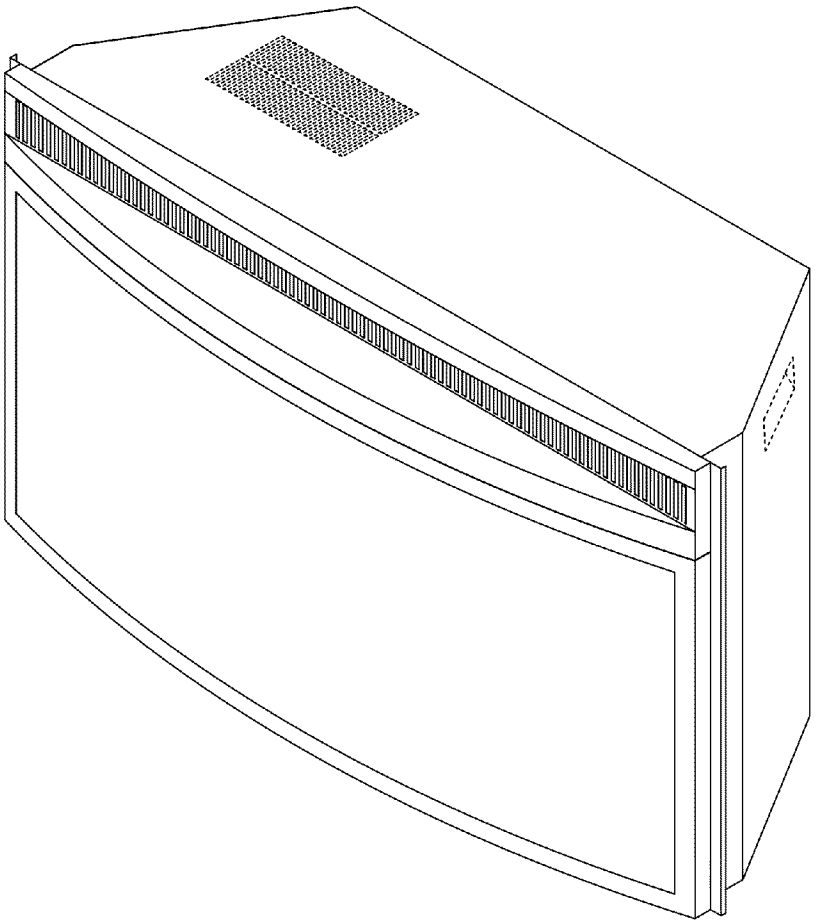
Figure 18:
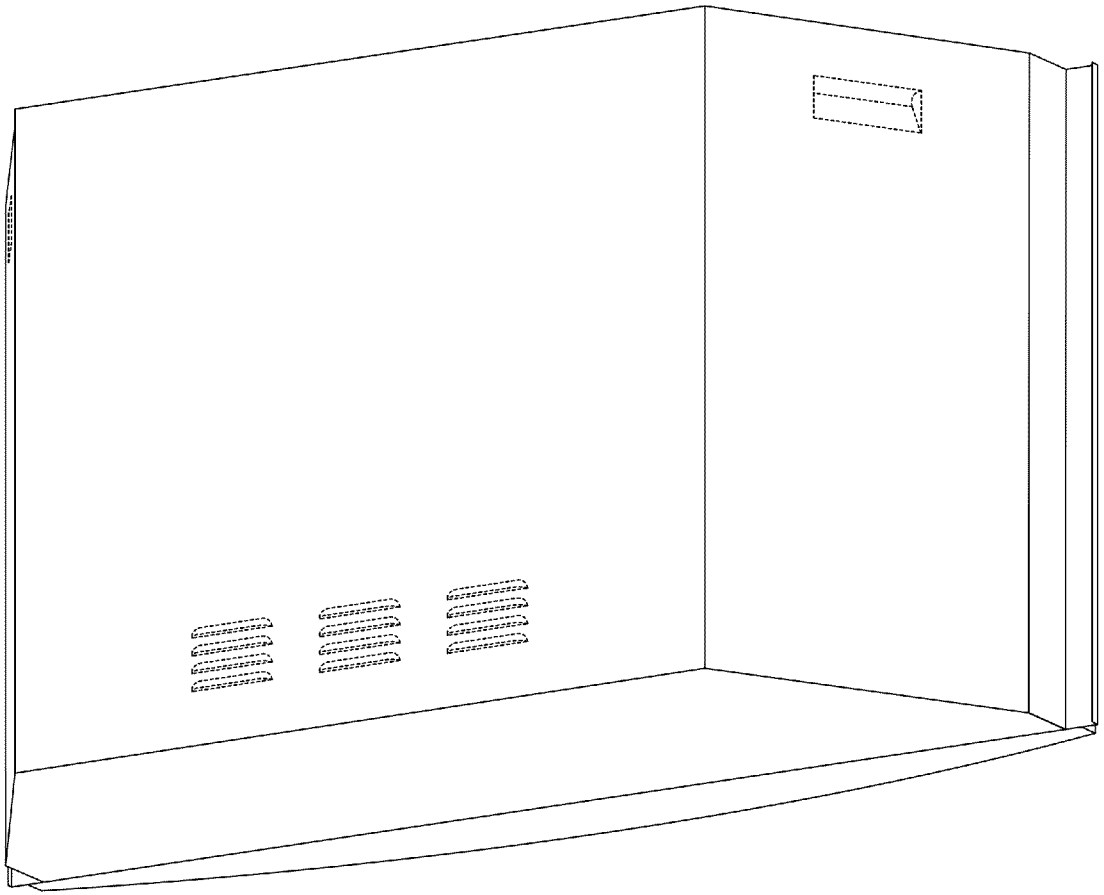
Figure 19:
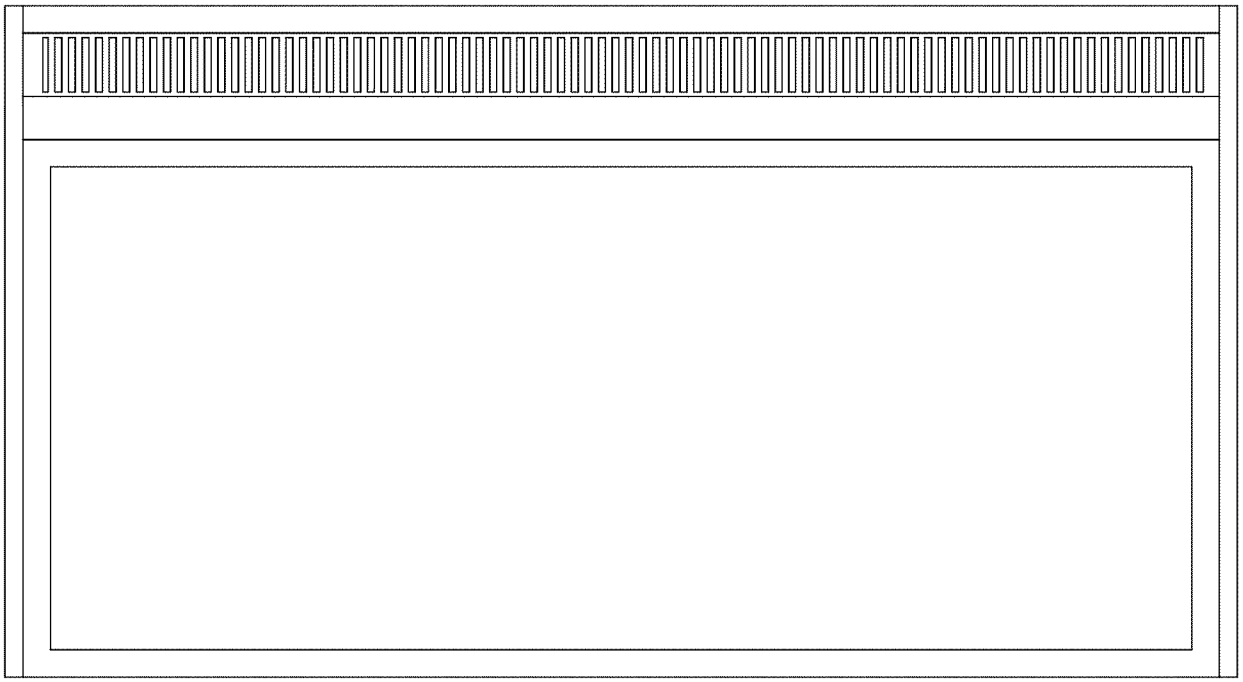
Figure 20:
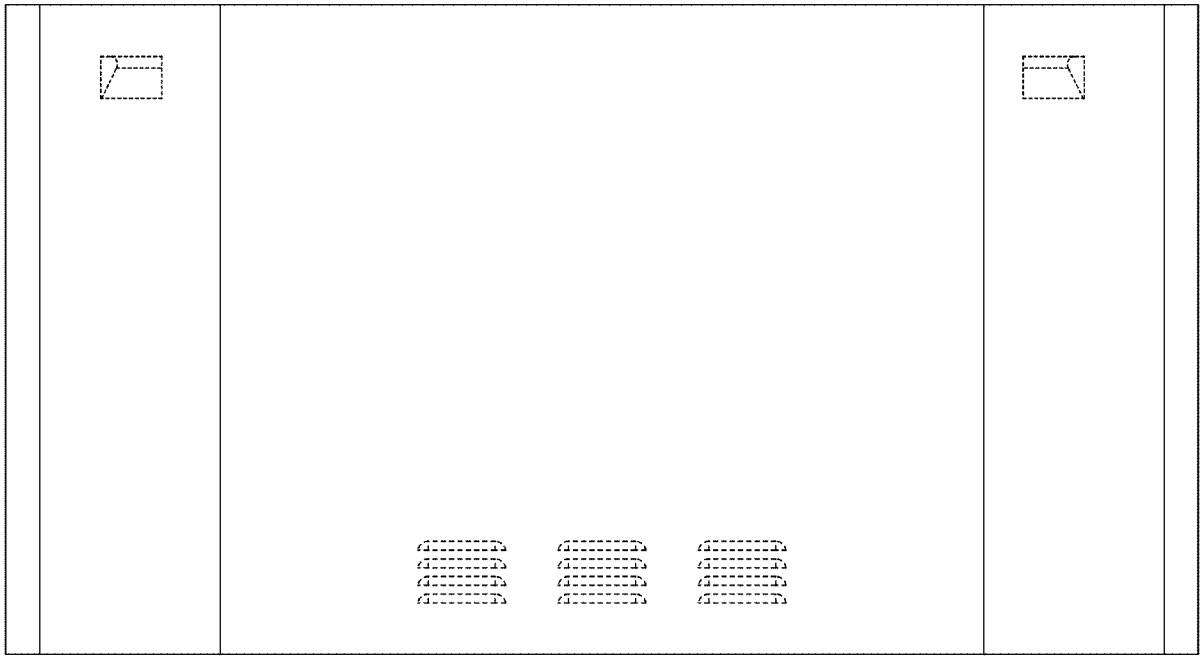
Figure 21:
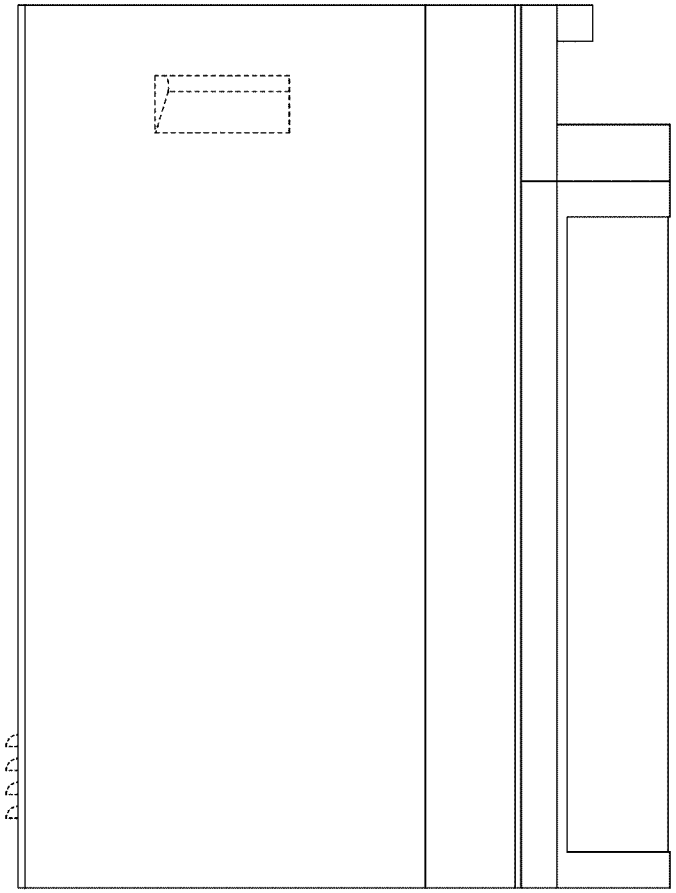
Figure 22:
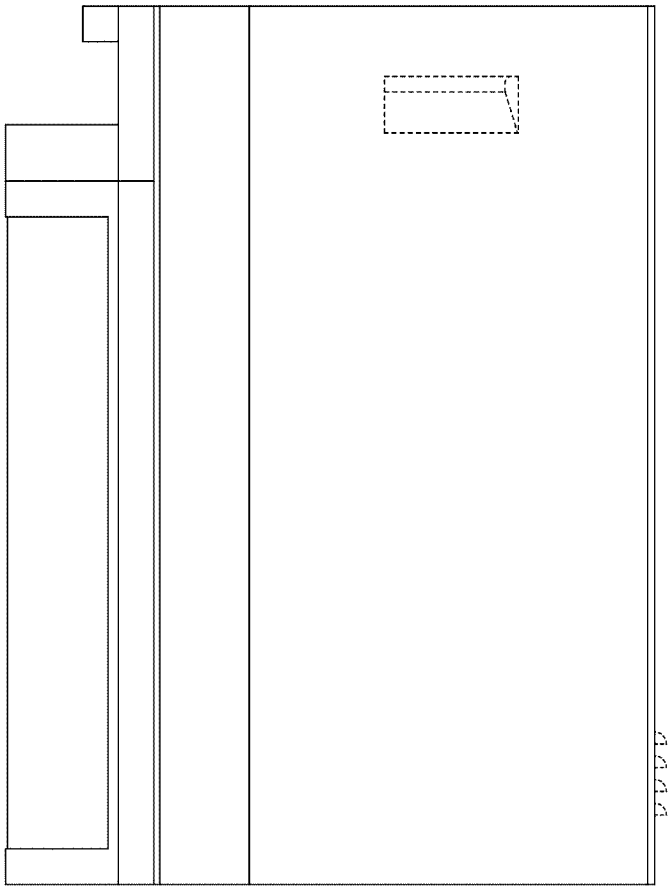
Figure 23:
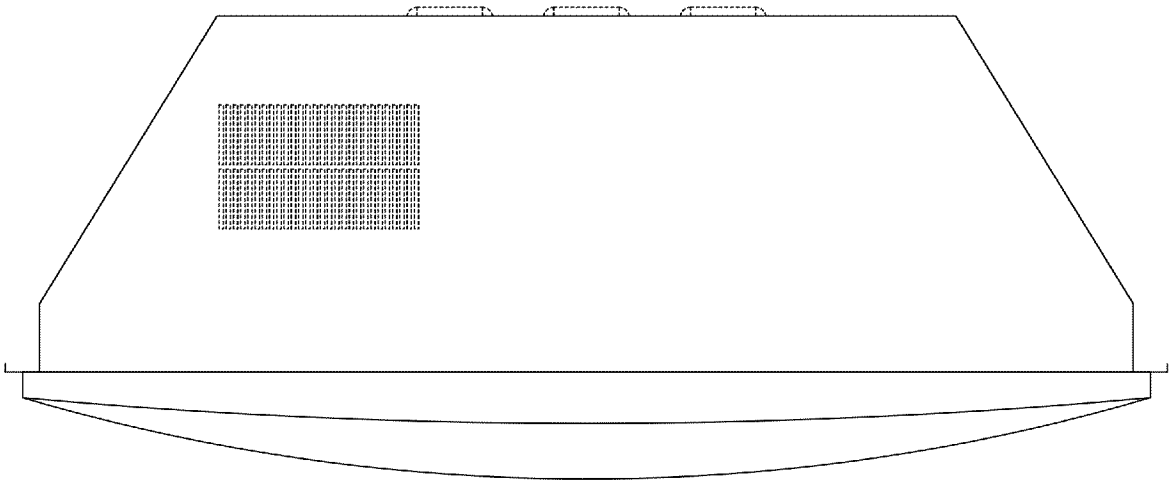
Figure 24:
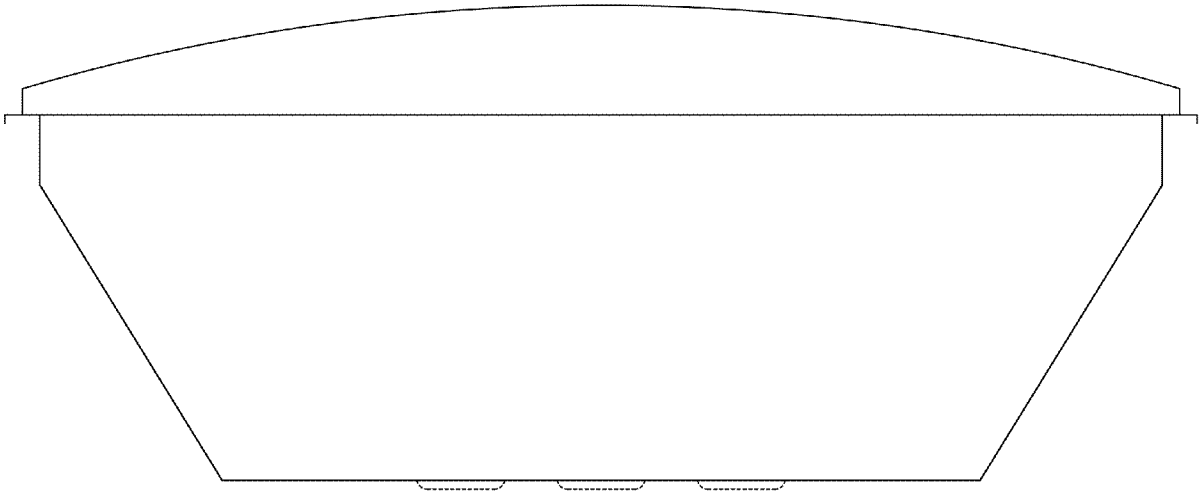
Figure 25:
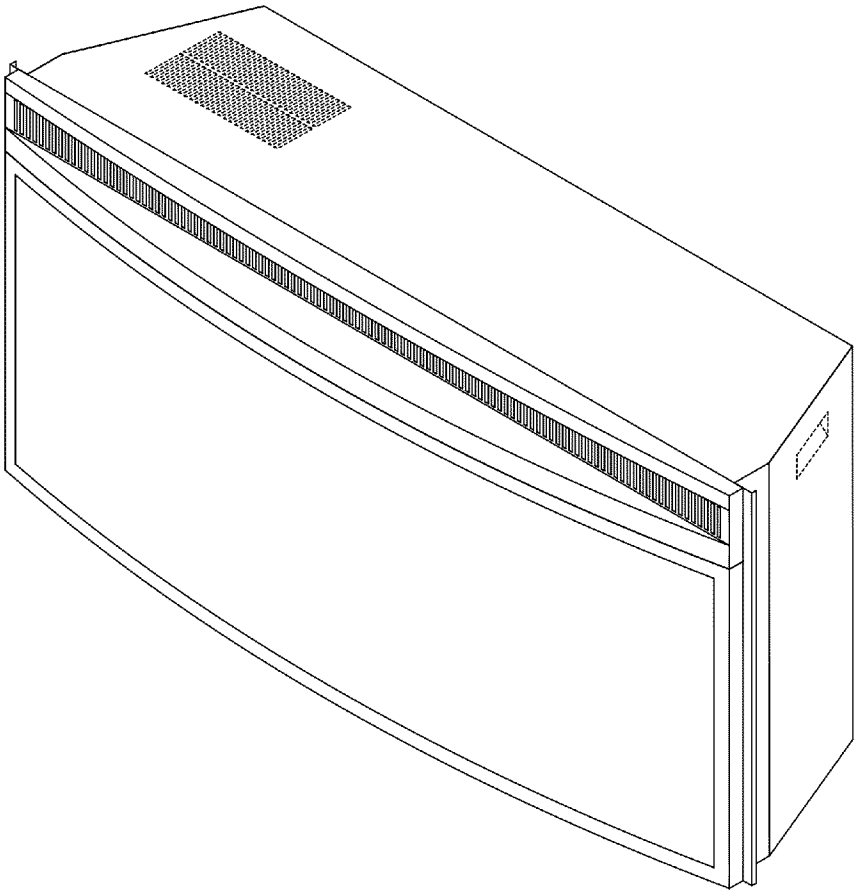
Figure 27:
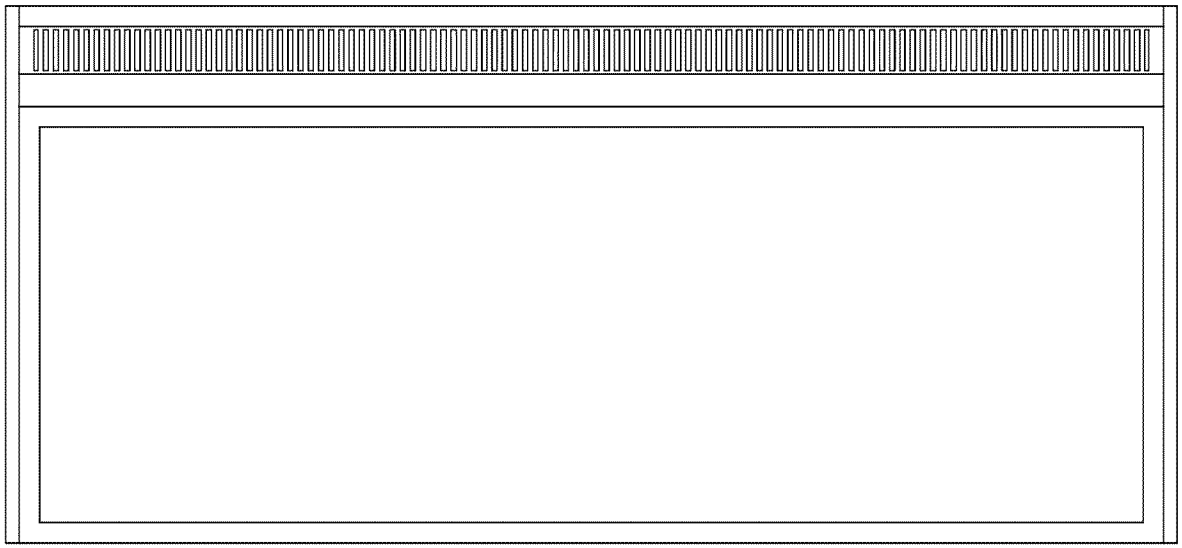
Figure 28:
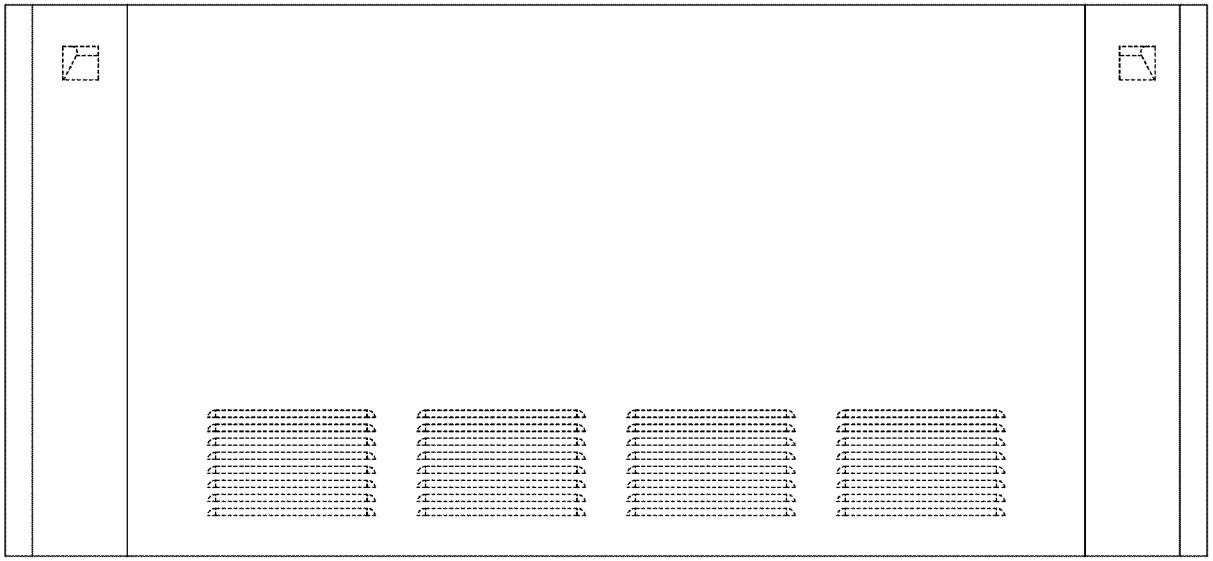
Figure 29:
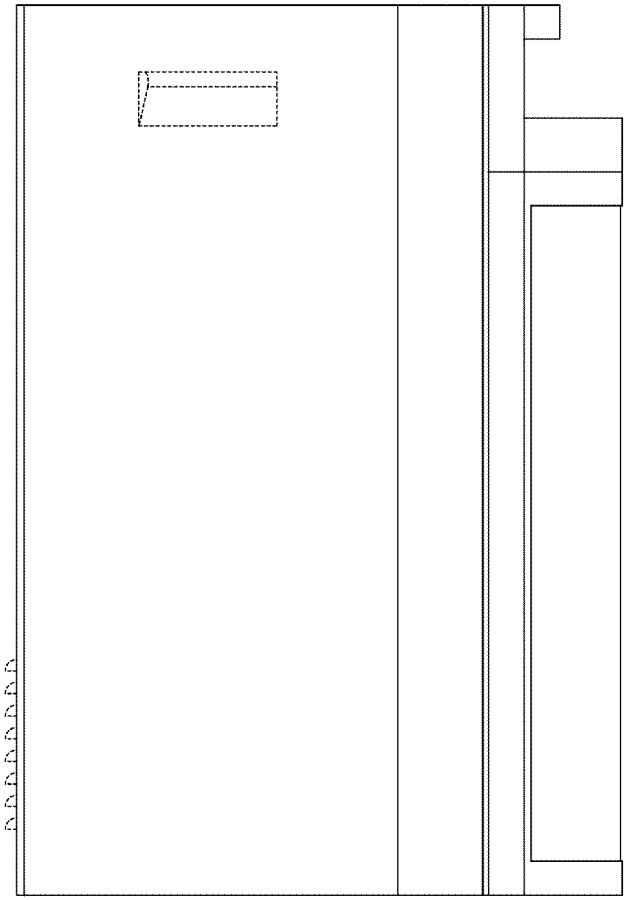
Figure 30:
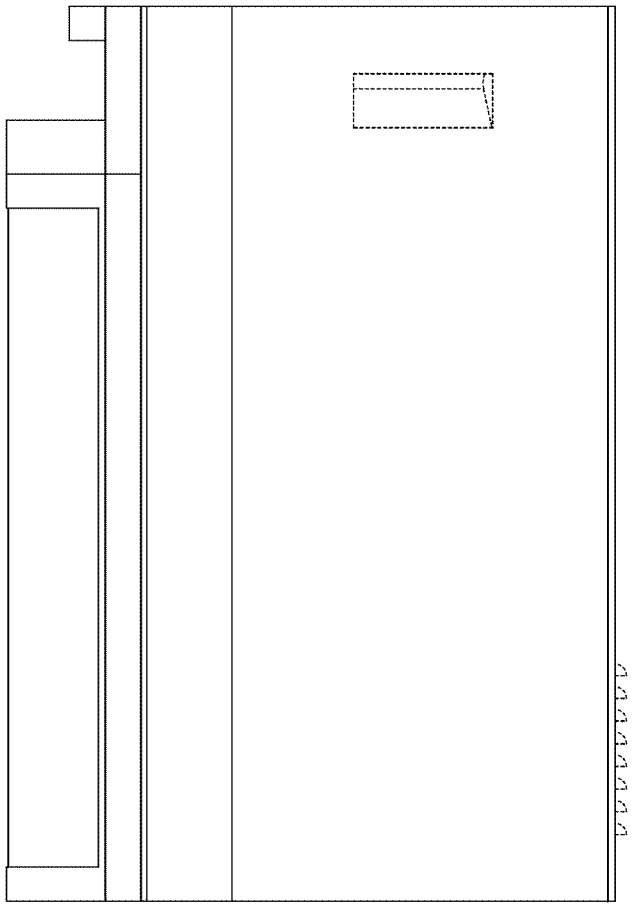
Figure 31:
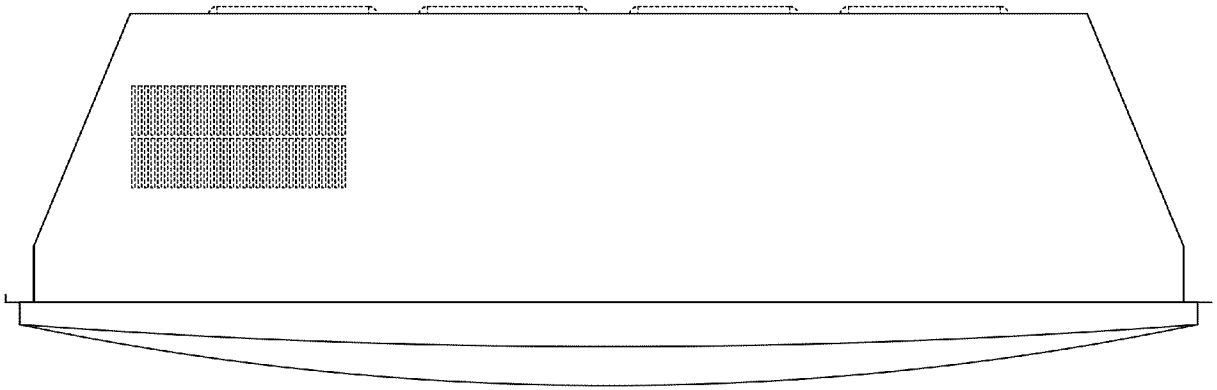
Figure 32:
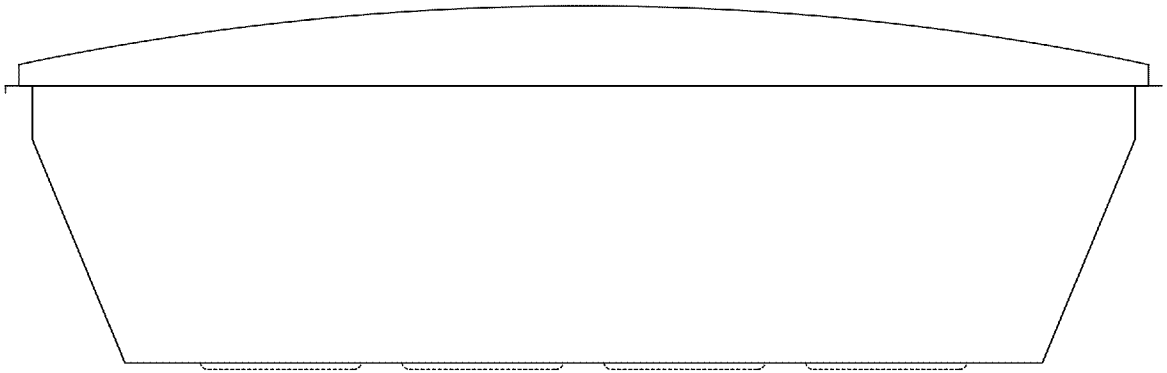
Figure 33:
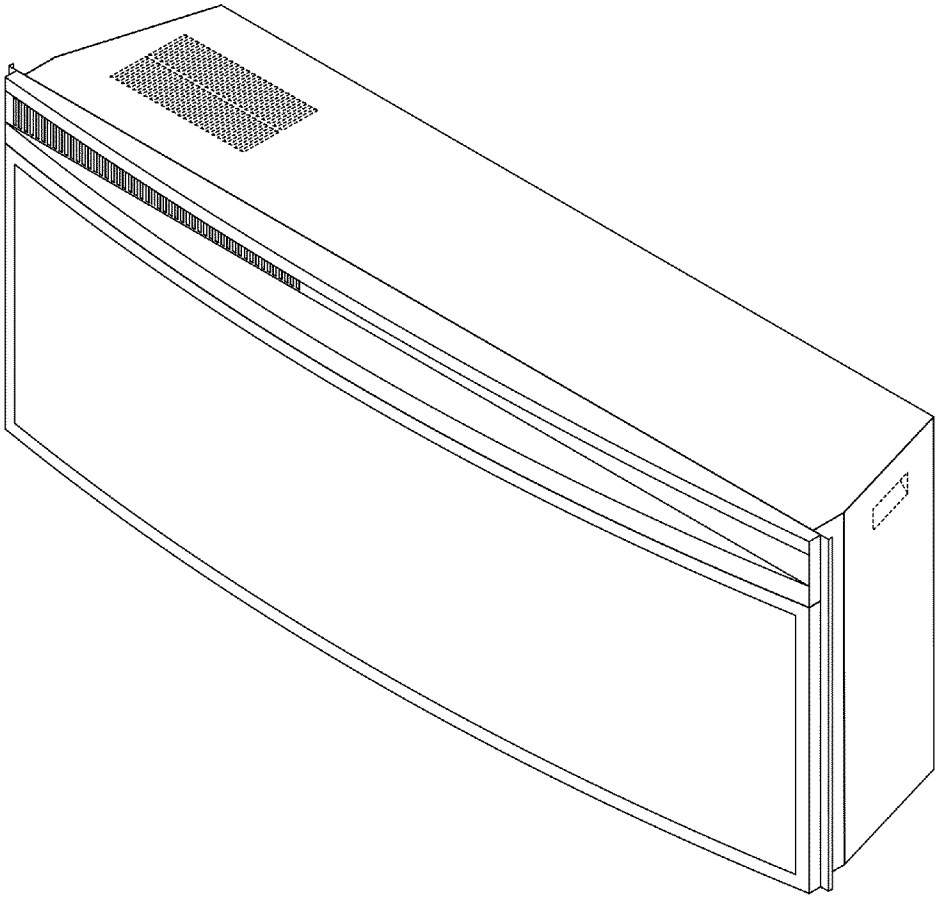
Figure 34:
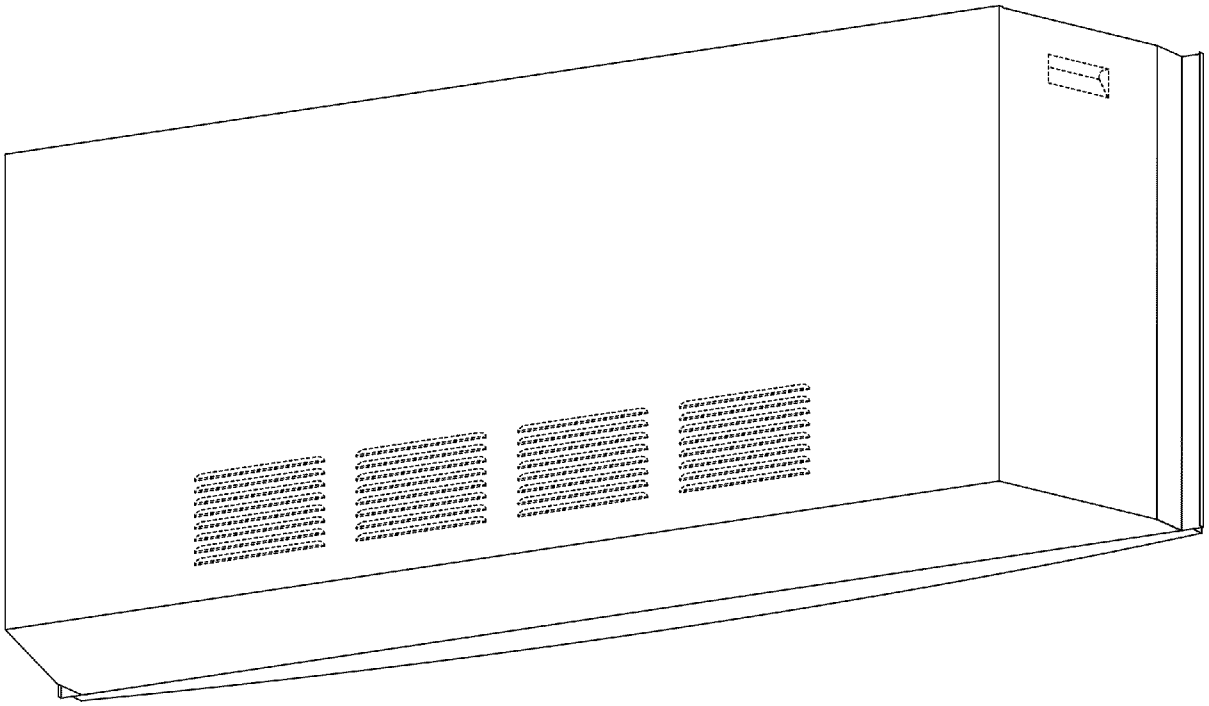
Figure 35:
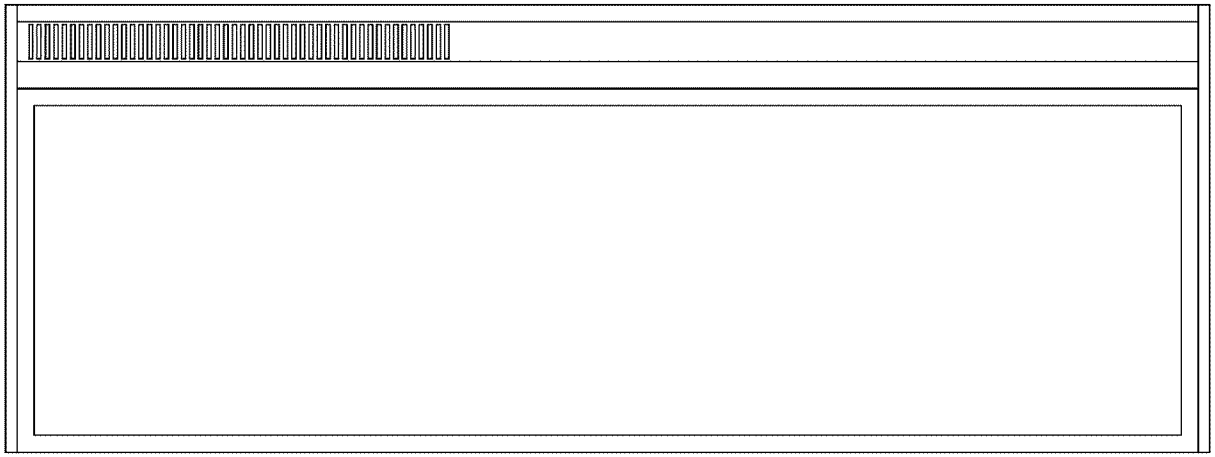
Figure 36:
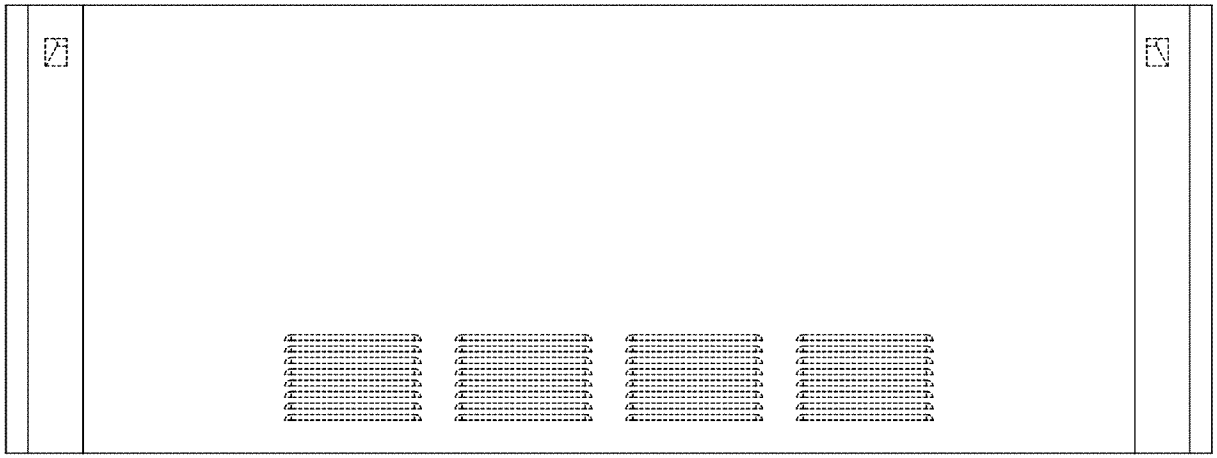
Figure 37:
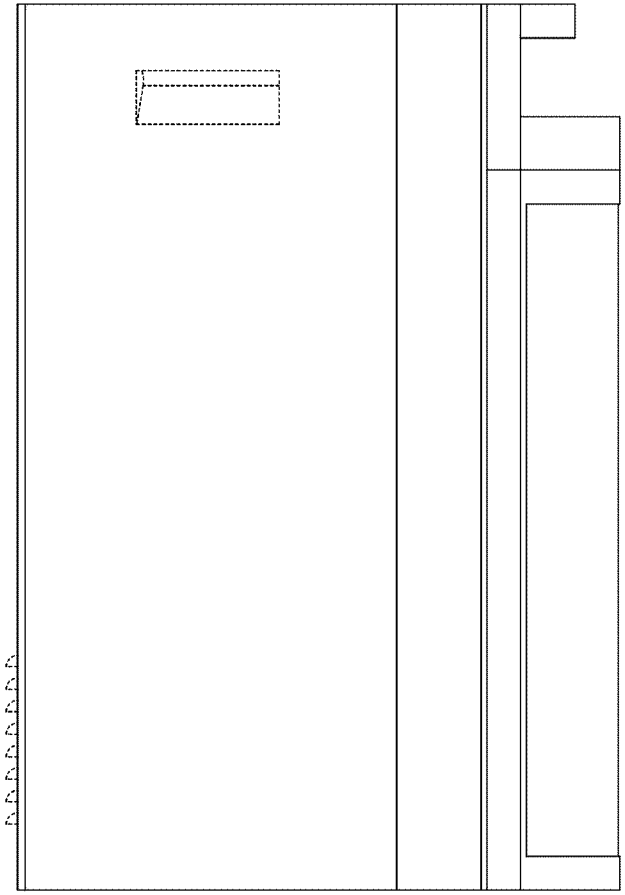
Figure 38:
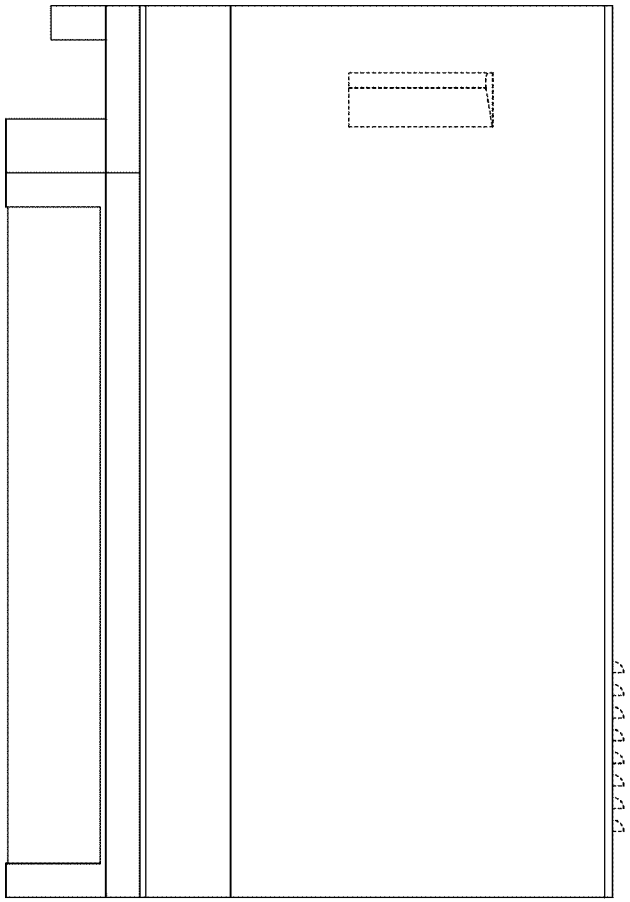
Figure 39:
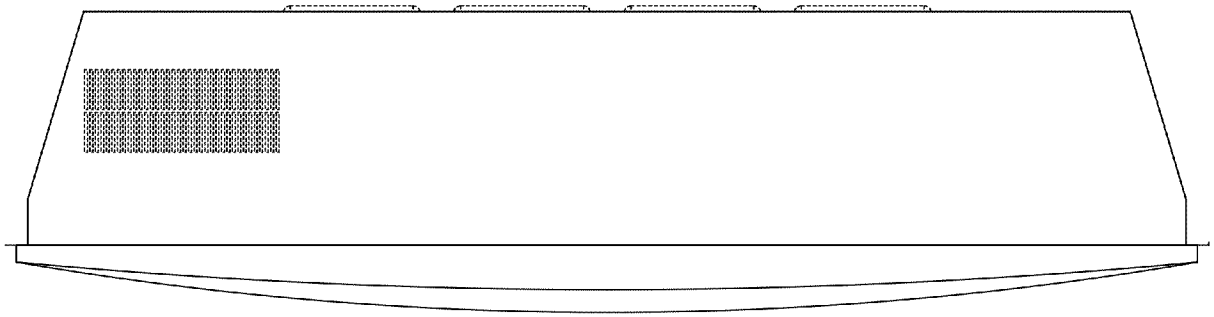
Figure 40:
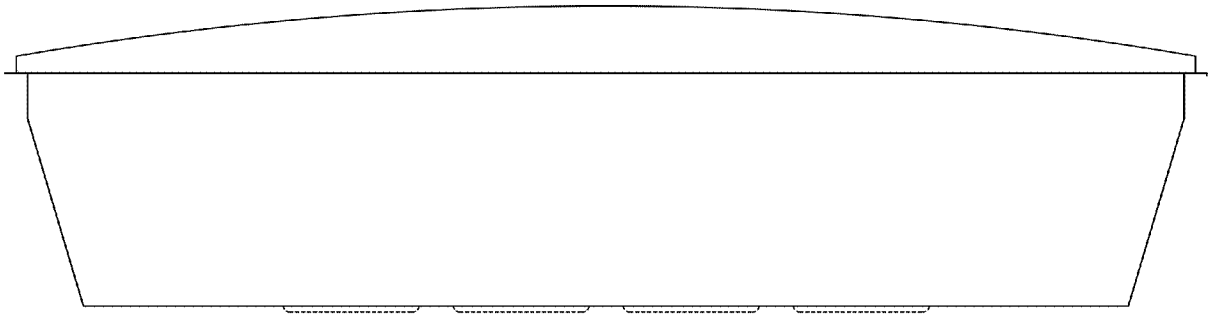
Figure 41:
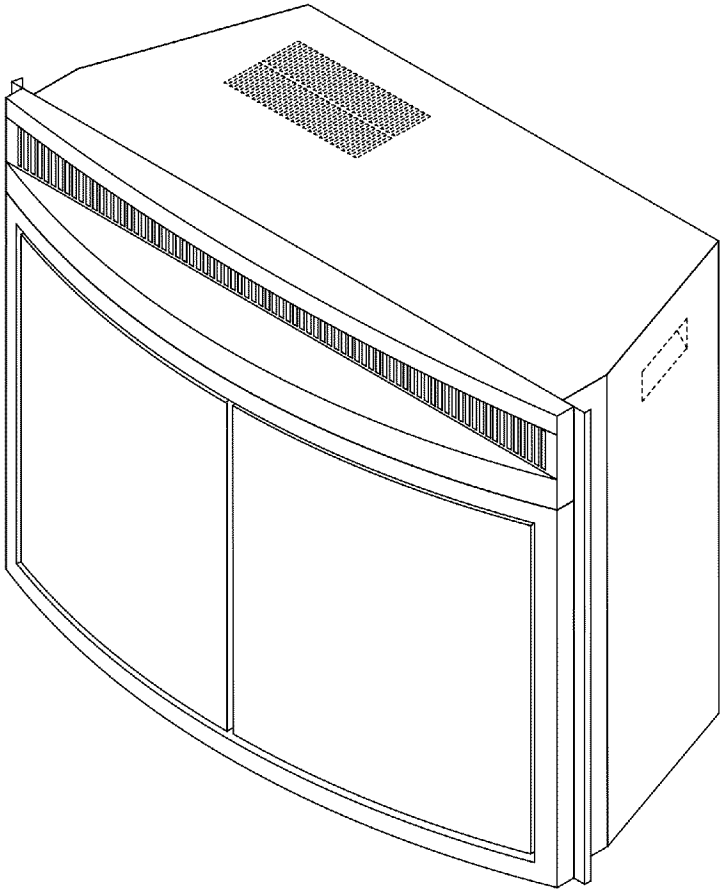
Figure 42:
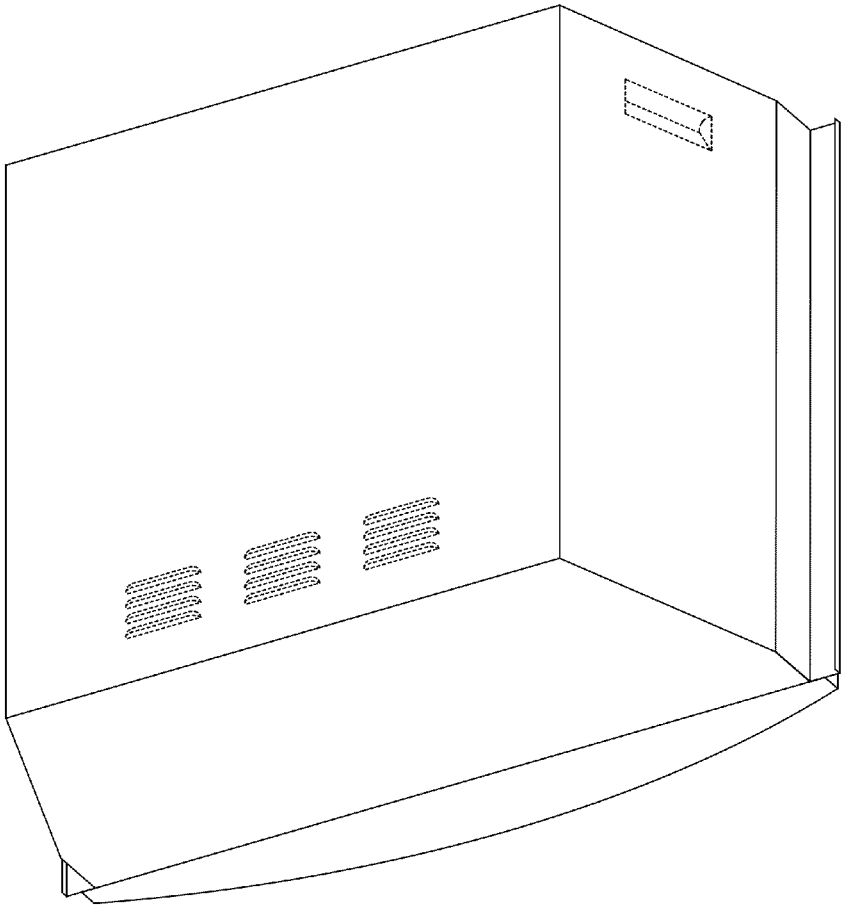
Figure 43:
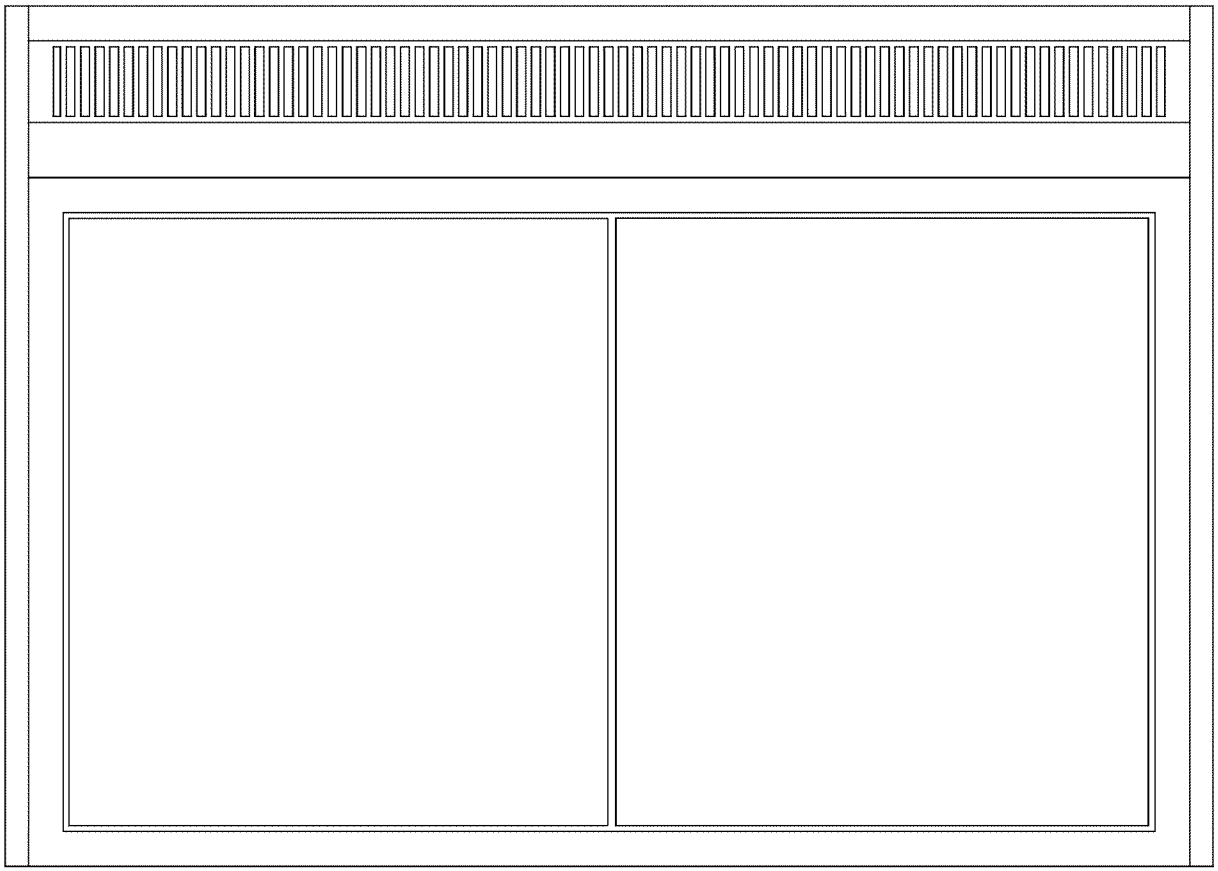
Figure 44:
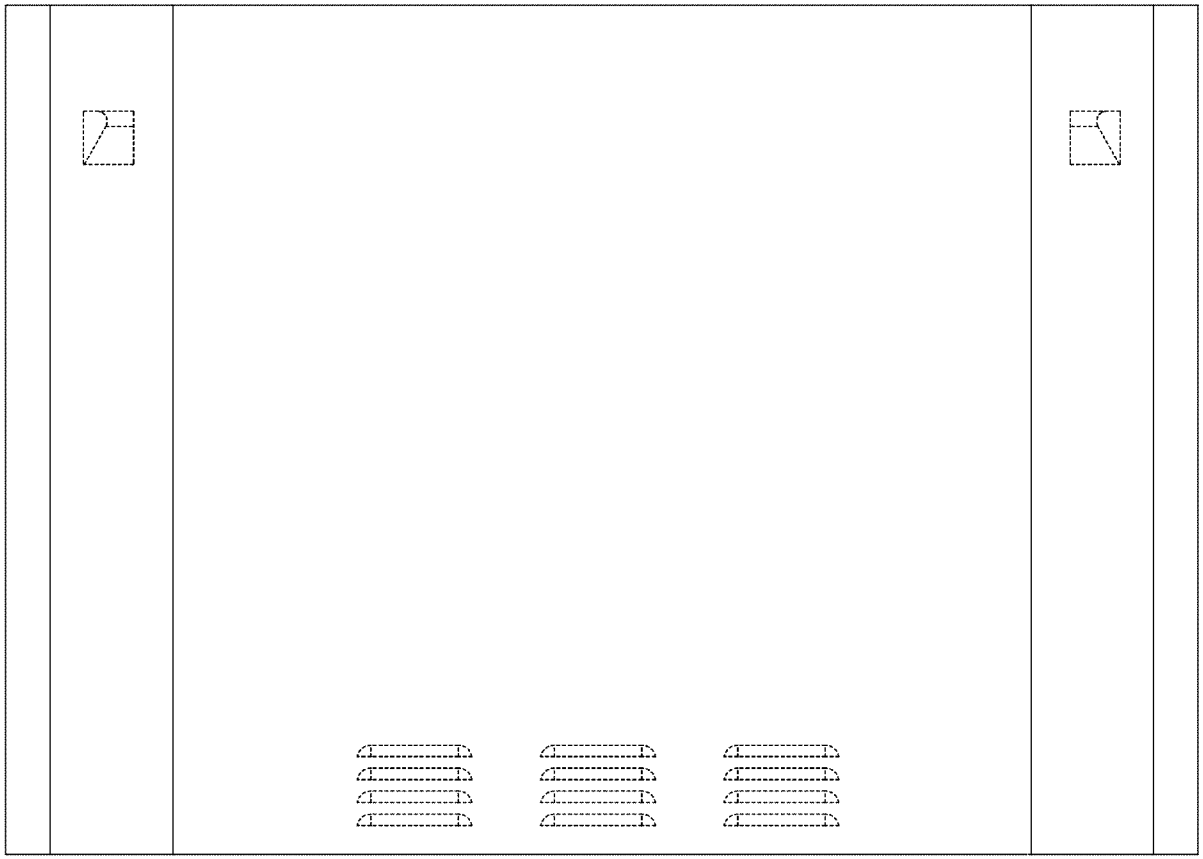
Figure 45:
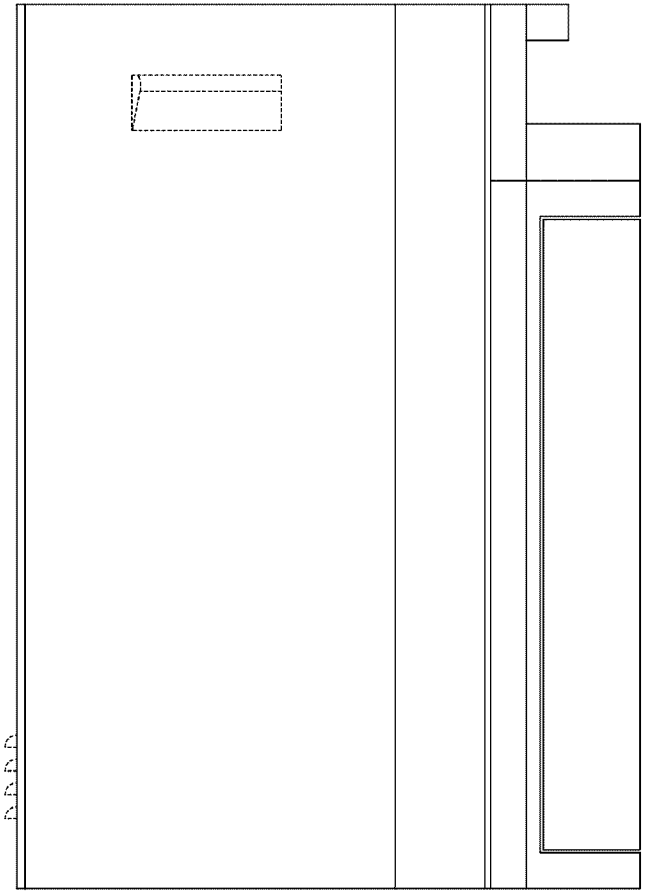
Figure 46:
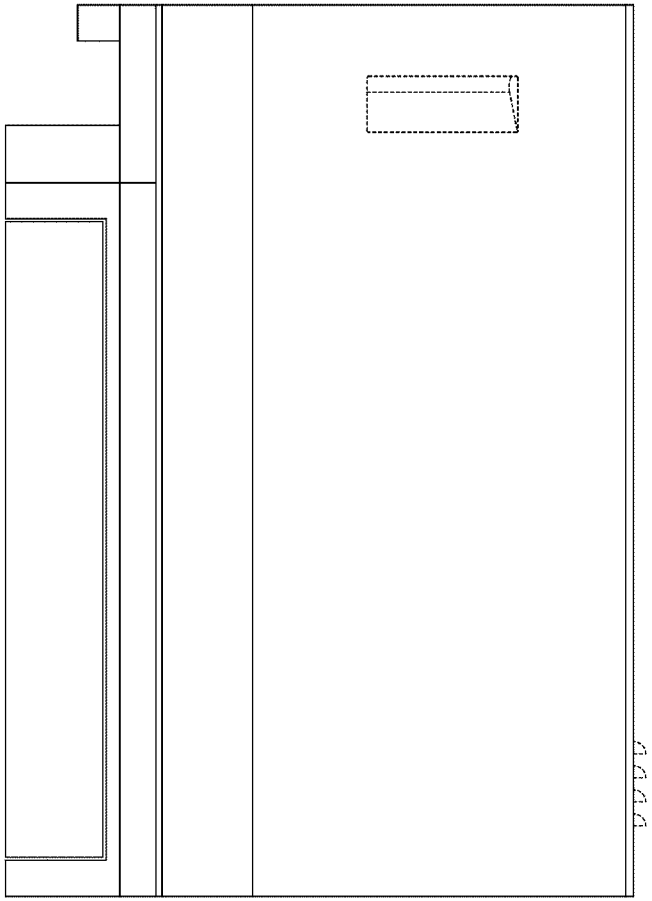
Figure 47:
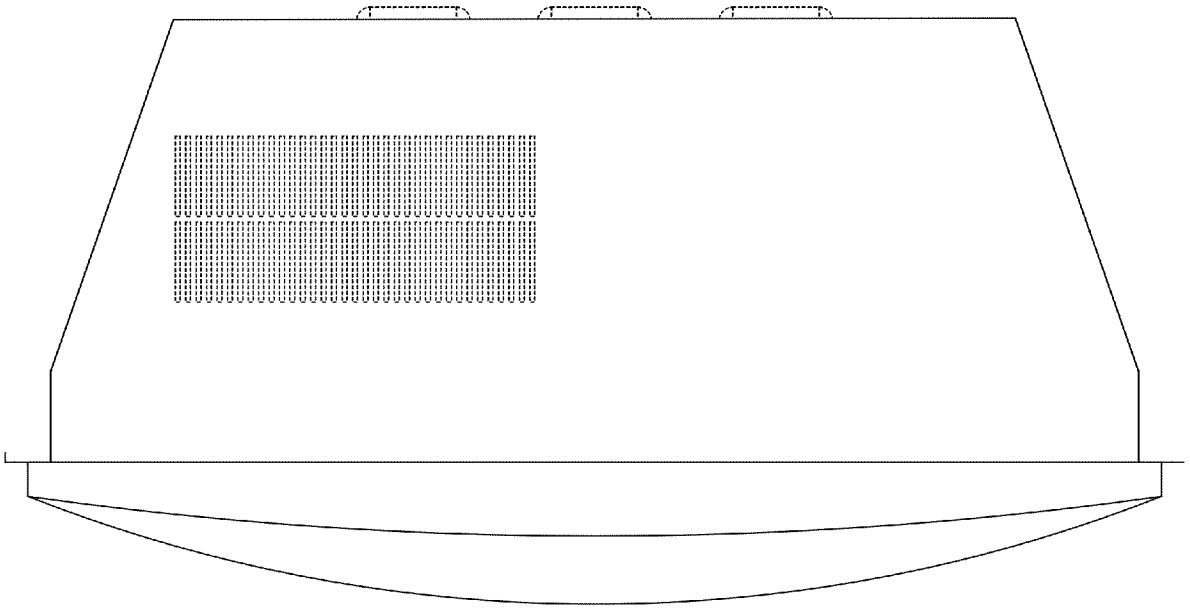
Figure 48:
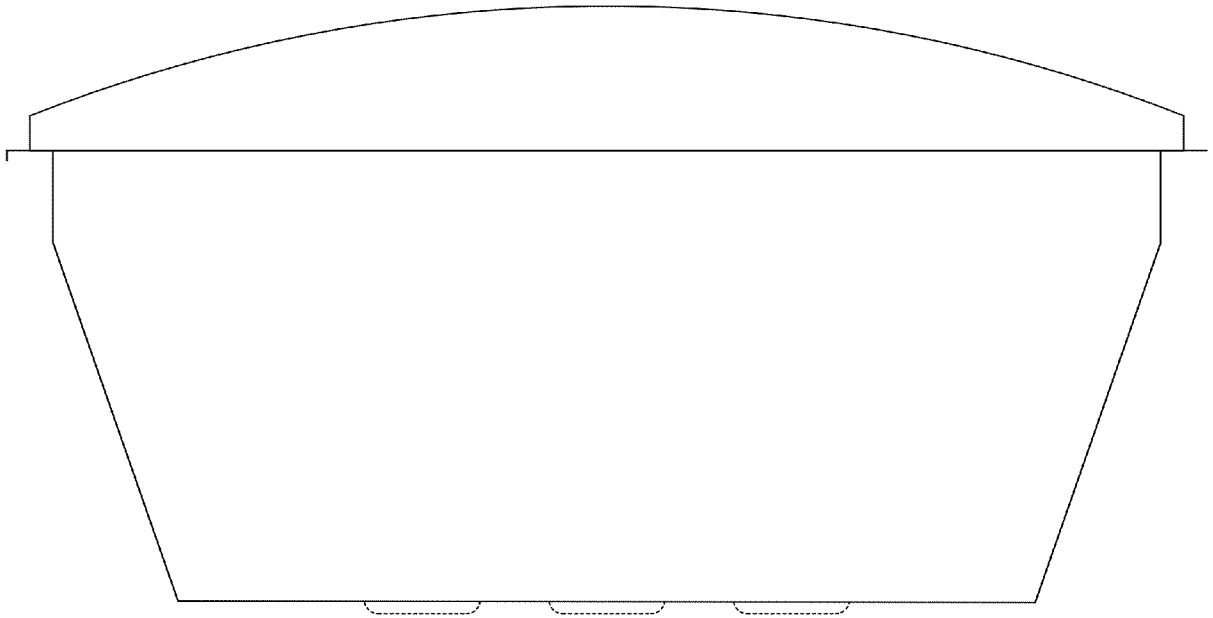
Figure 49:
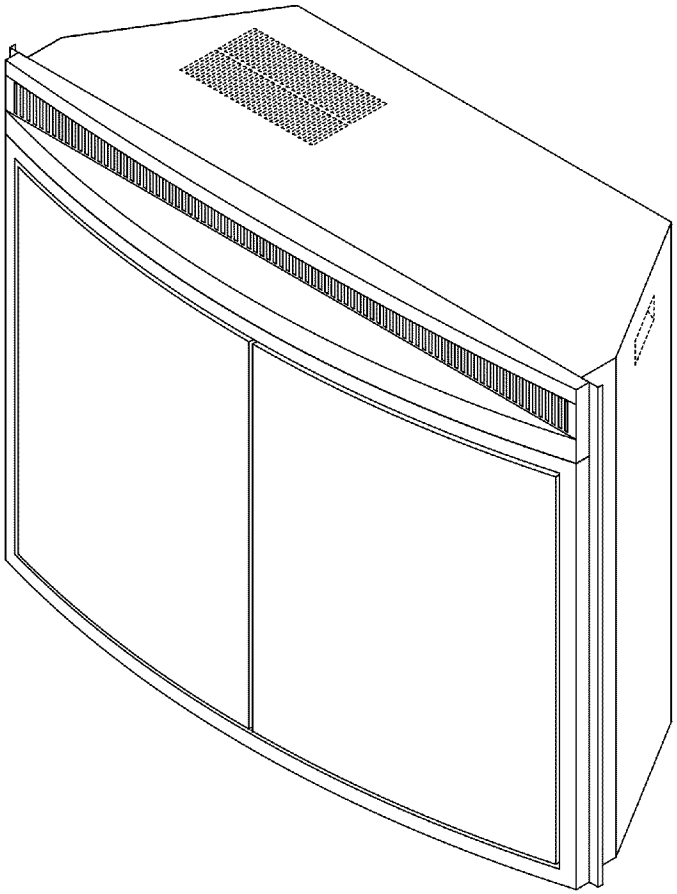
Figure 50:
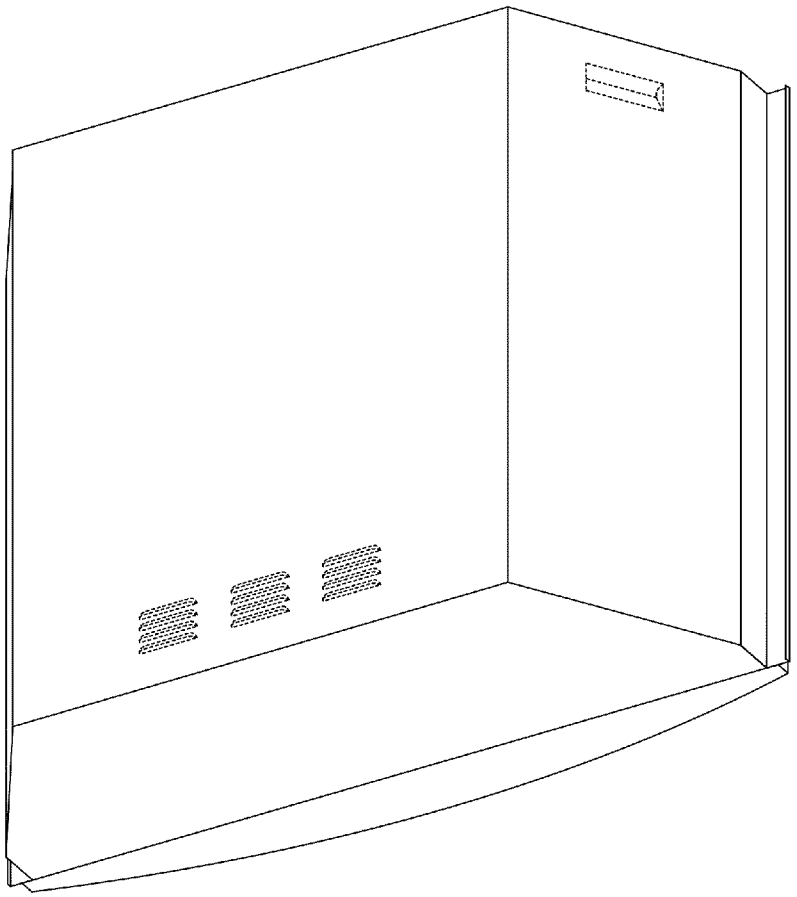
Figure 51:
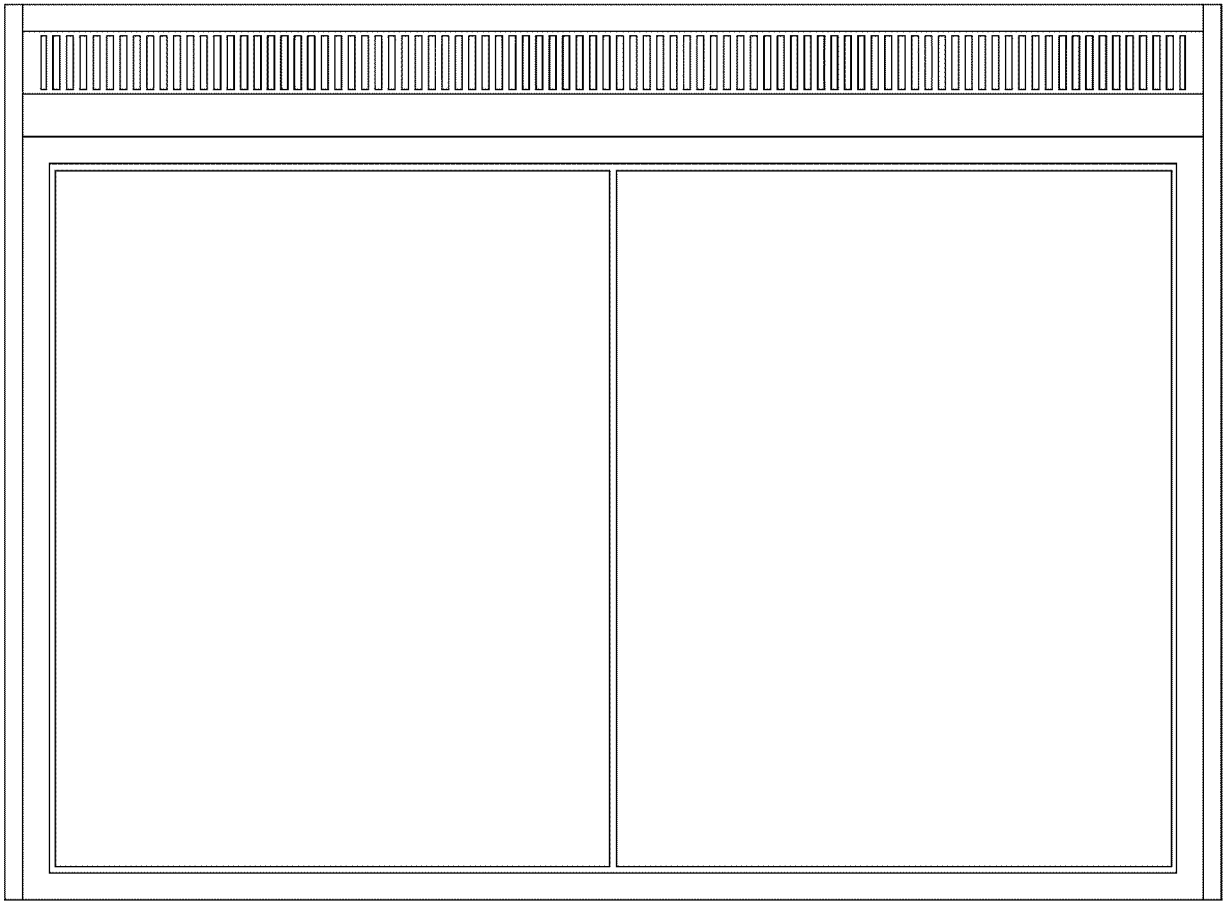
Figure 52:
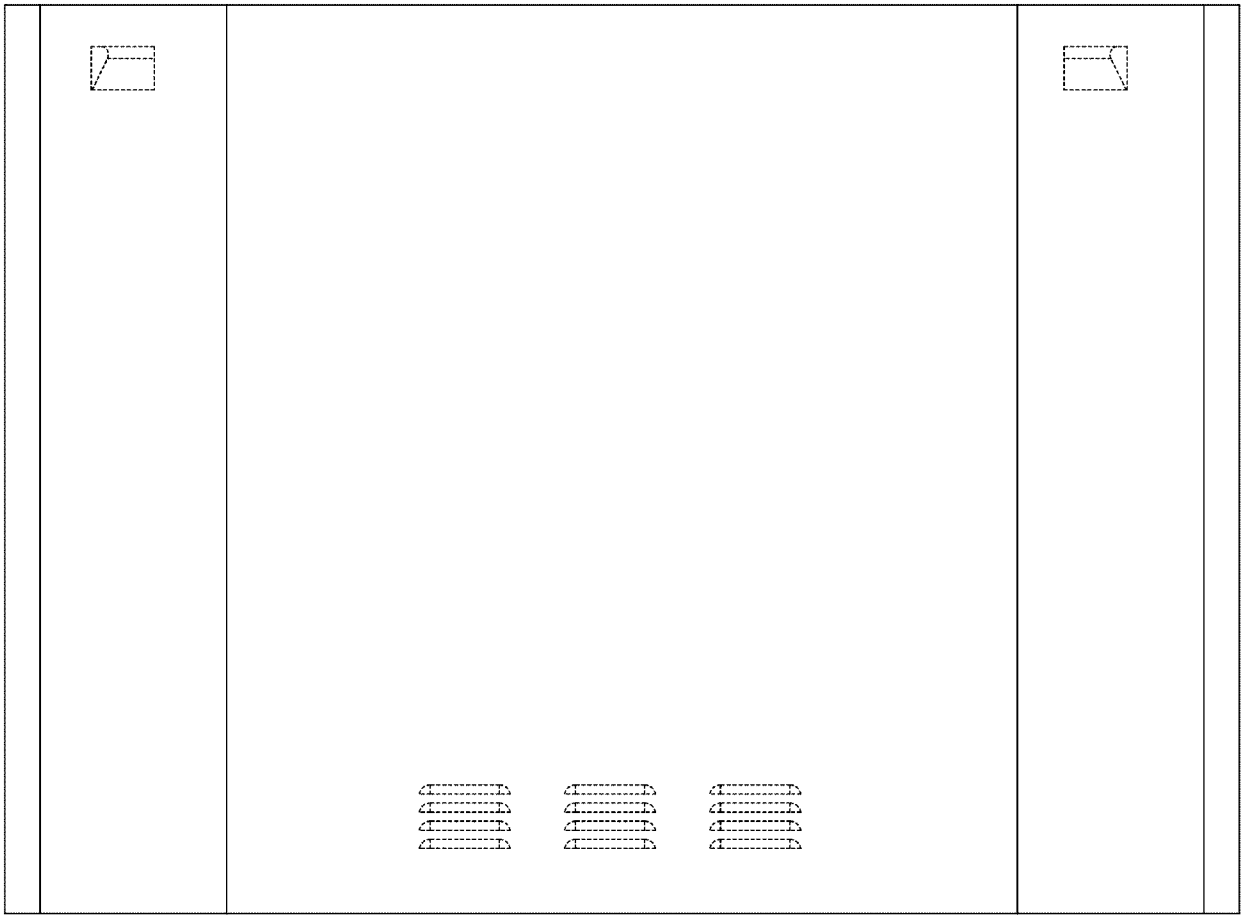
Figure 53:
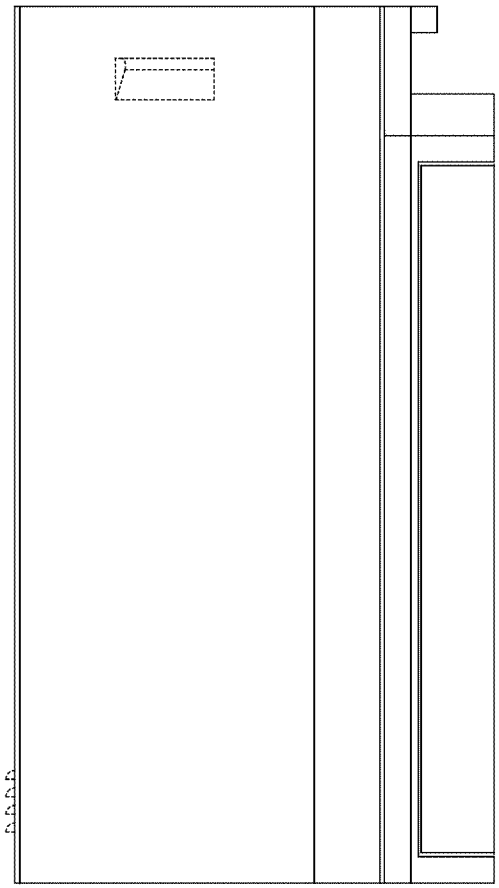
Figure 54:
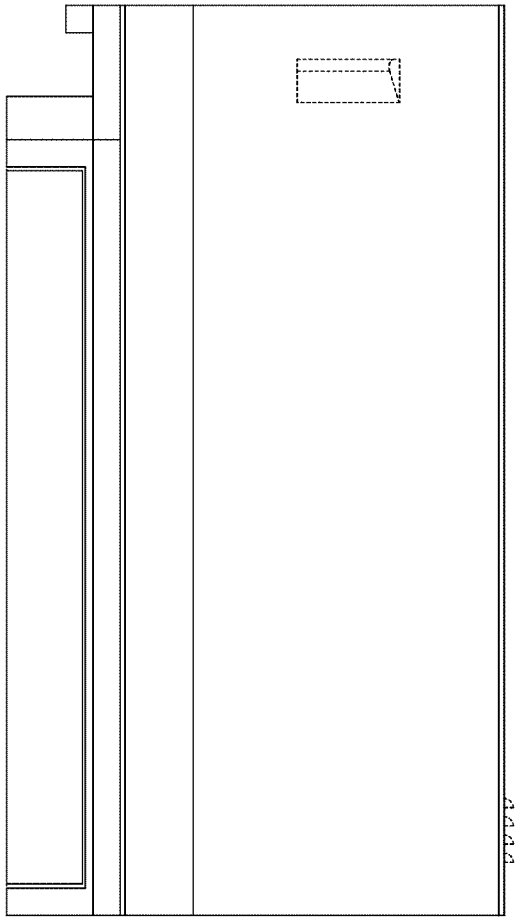
Figure 55:
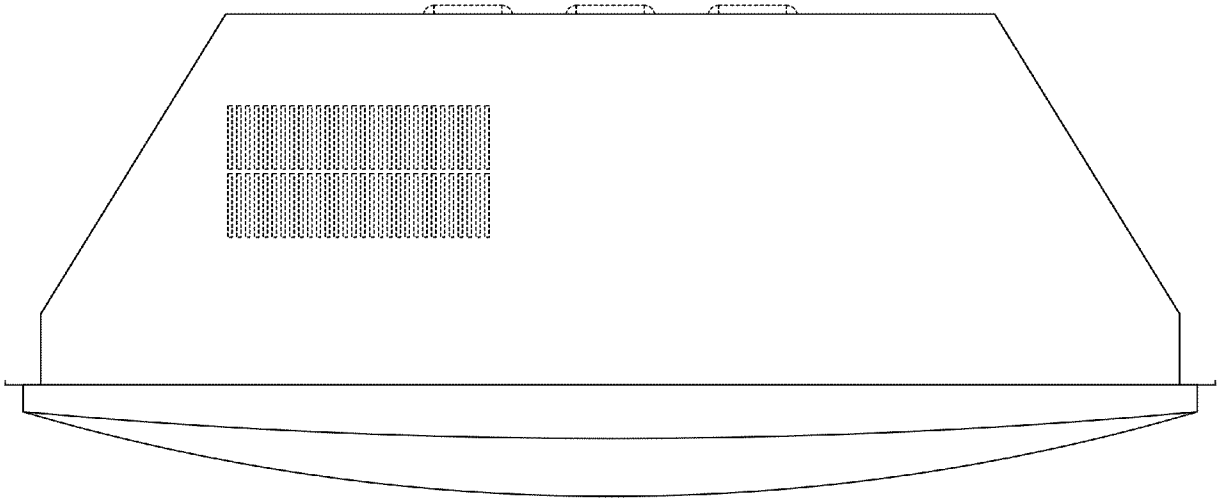
Figure 56:
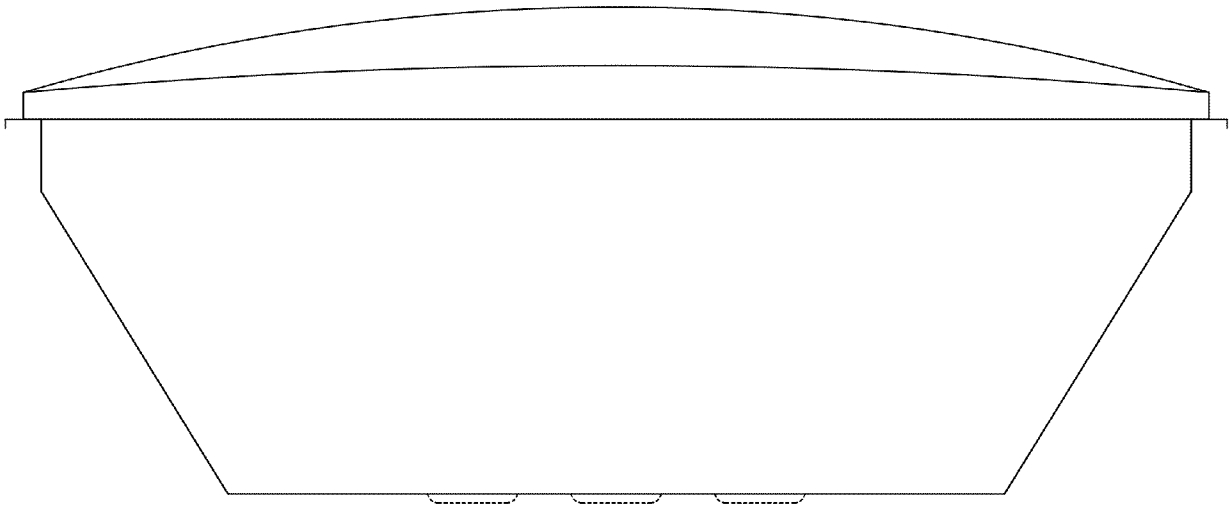
Figure 57:
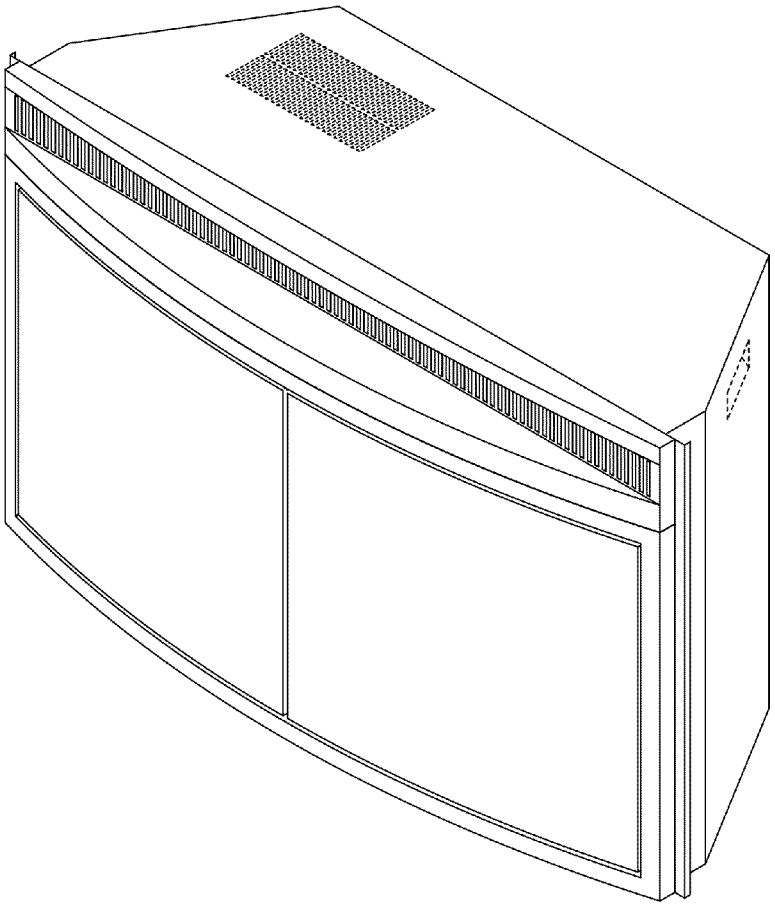
Figure 58:
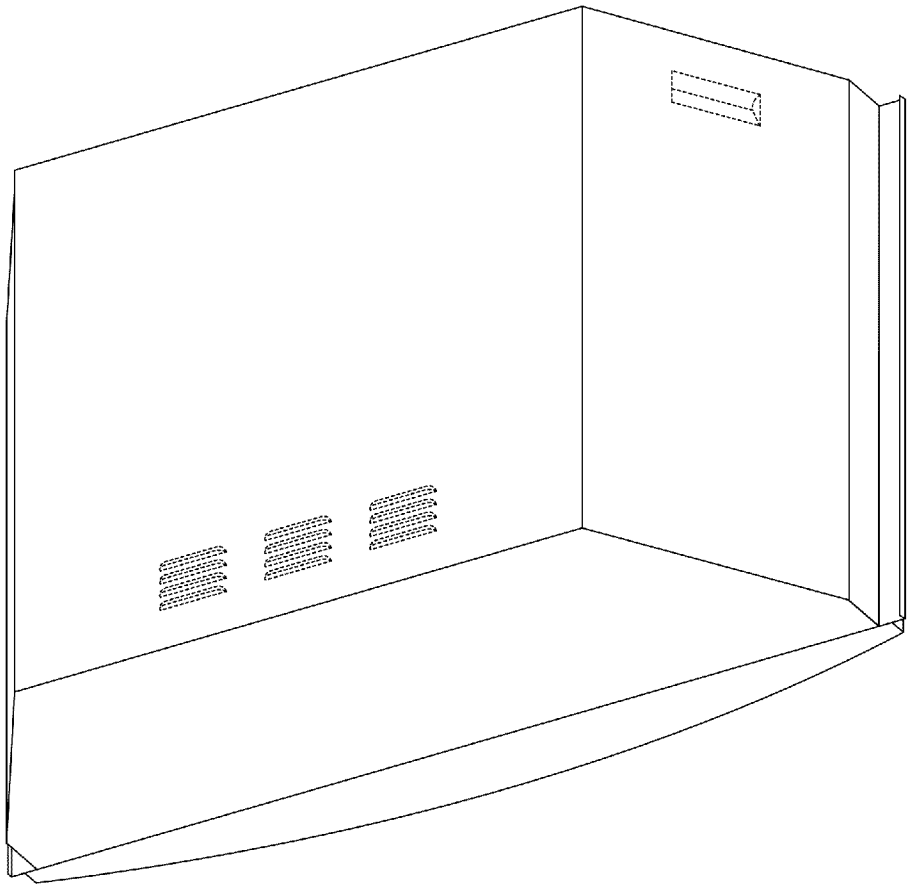
Figure 59:
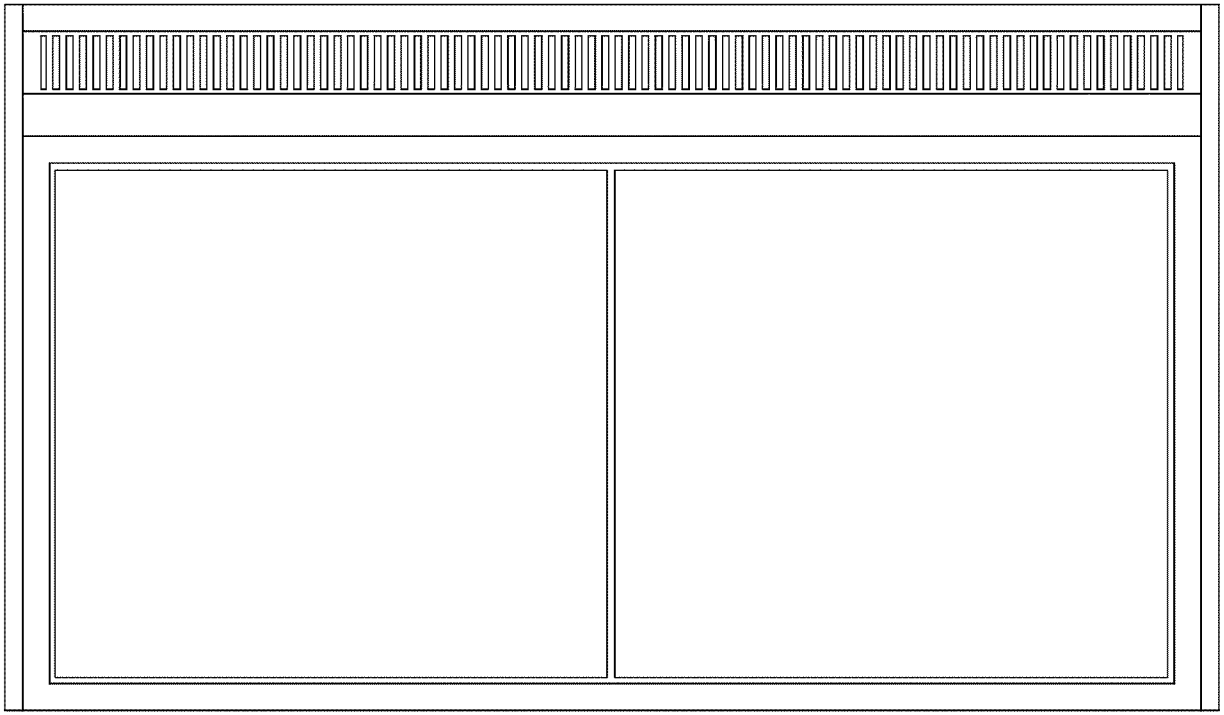
Figure 60:
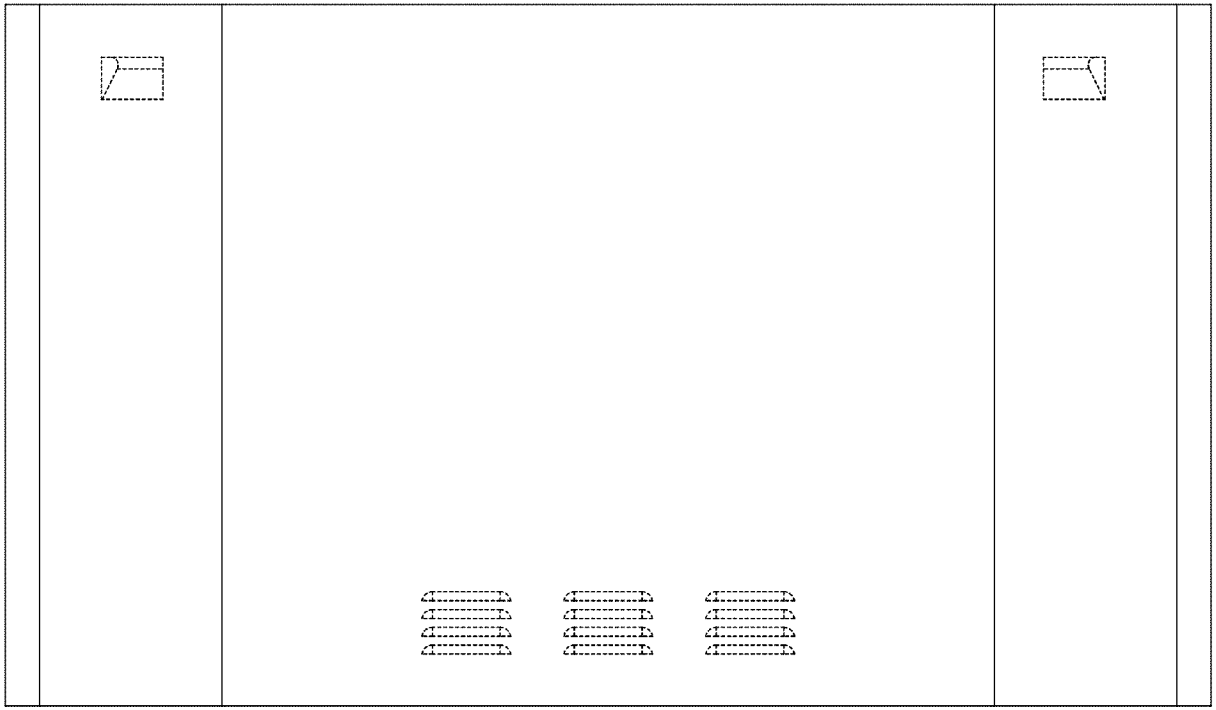
Figure 61:
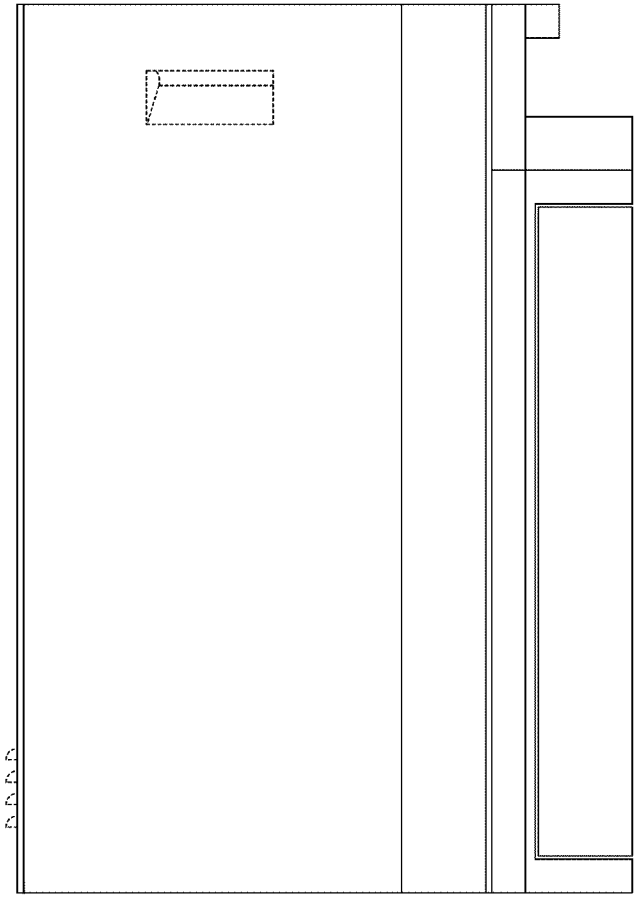
Figure 62:
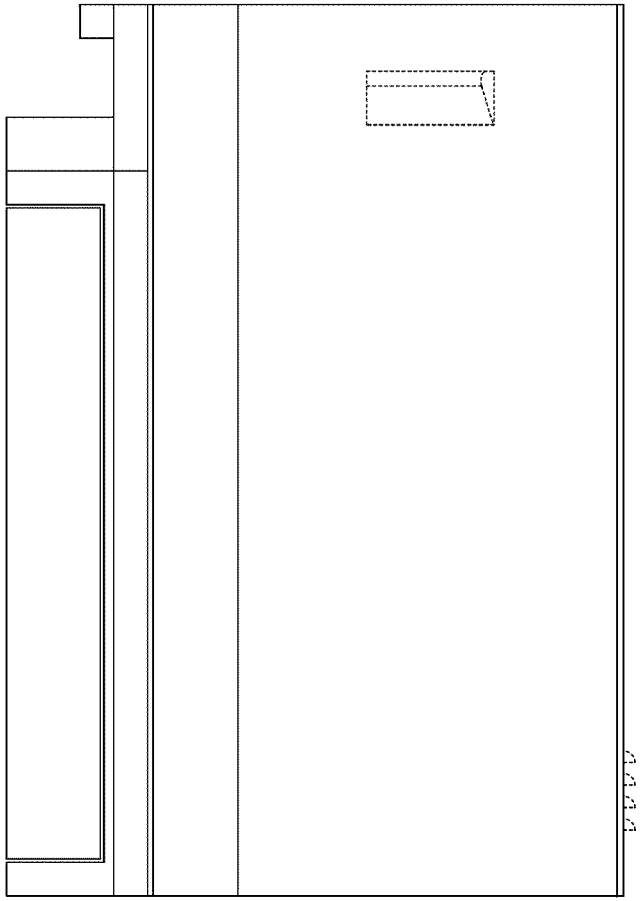
Figure 63:
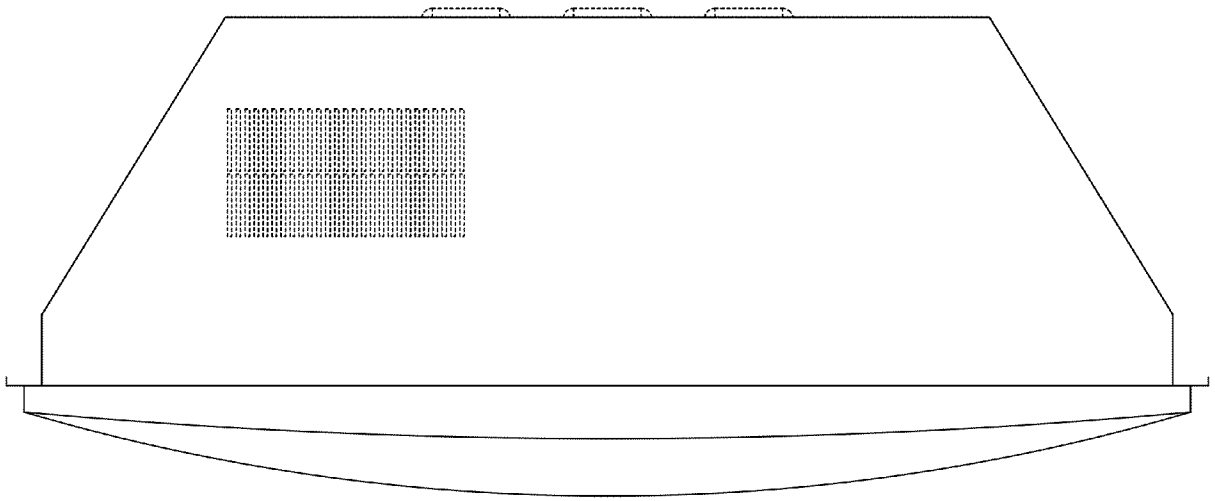
Figure 64:
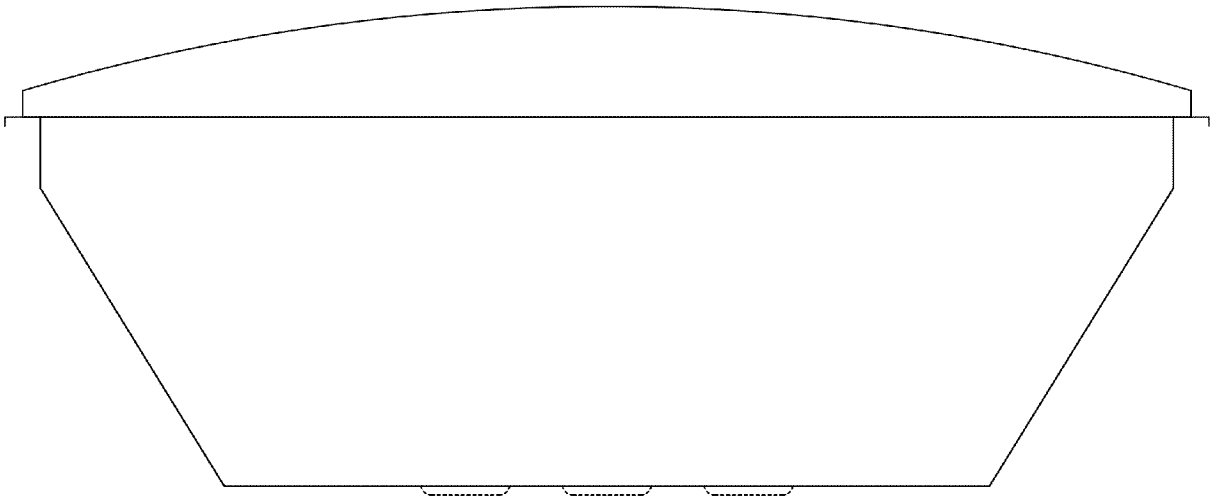
Figure 65:
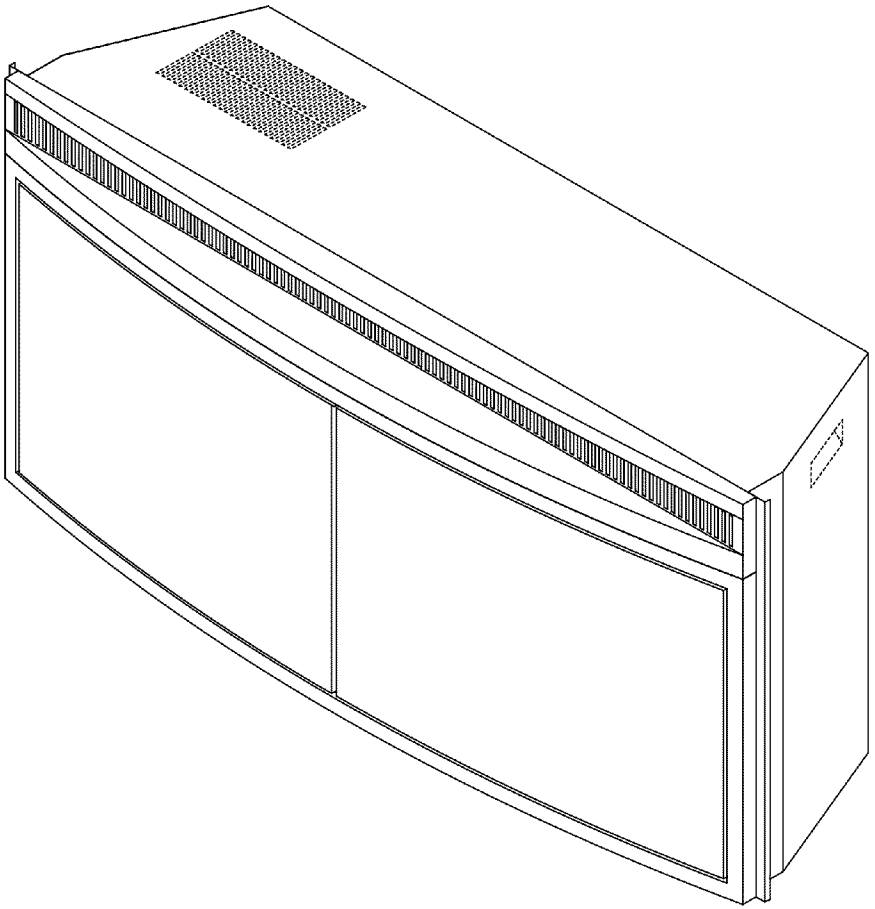
Figure 66:
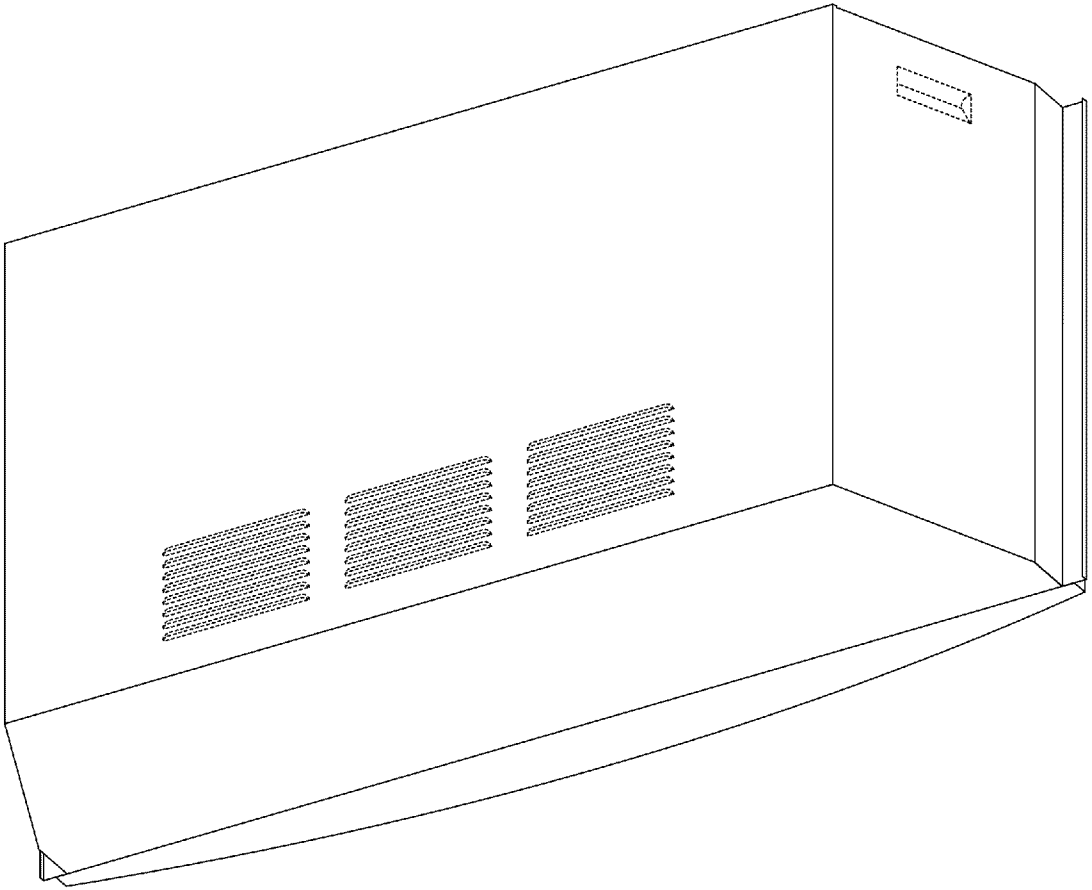
Figure 67:
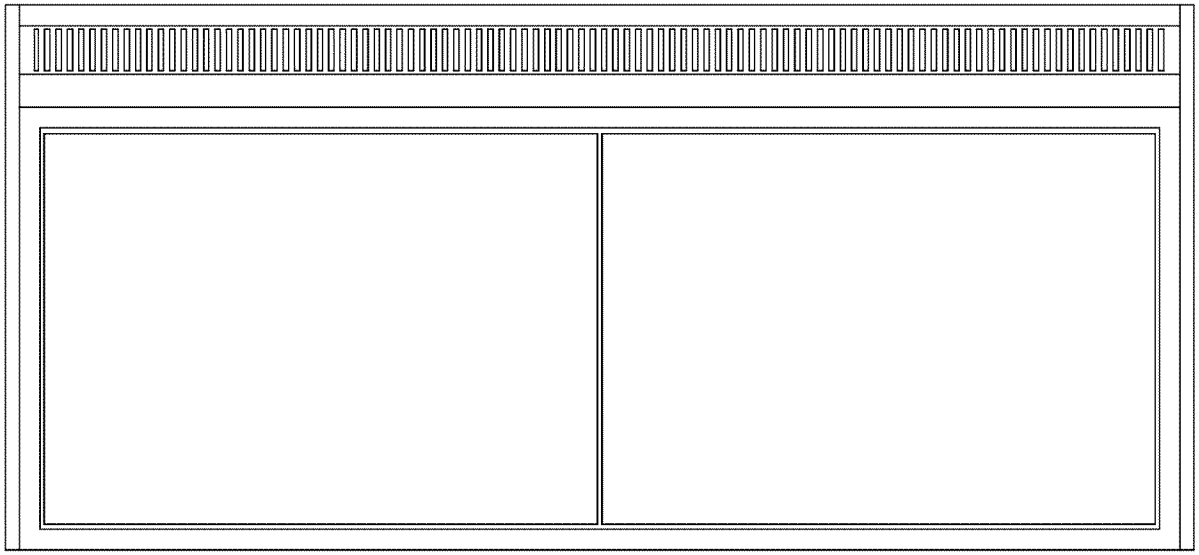
Figure 68:
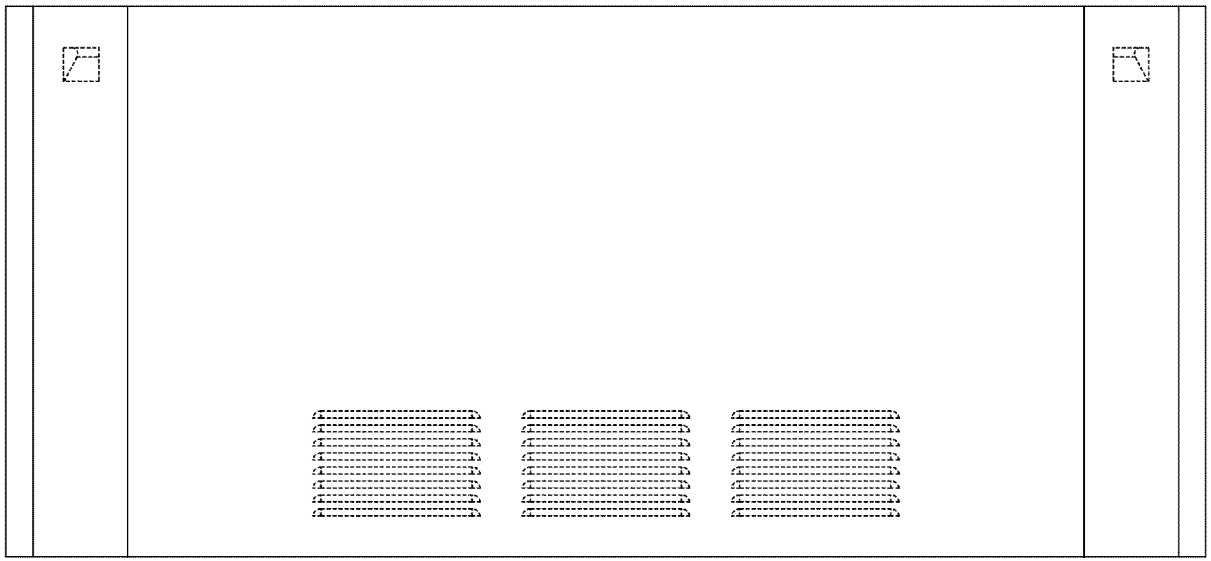
Figure 69:
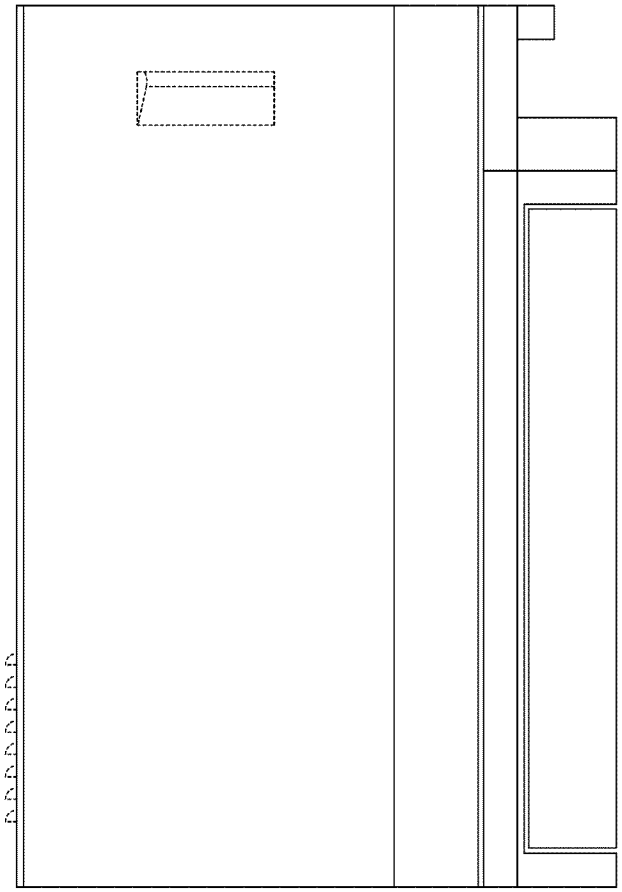
Figure 70:
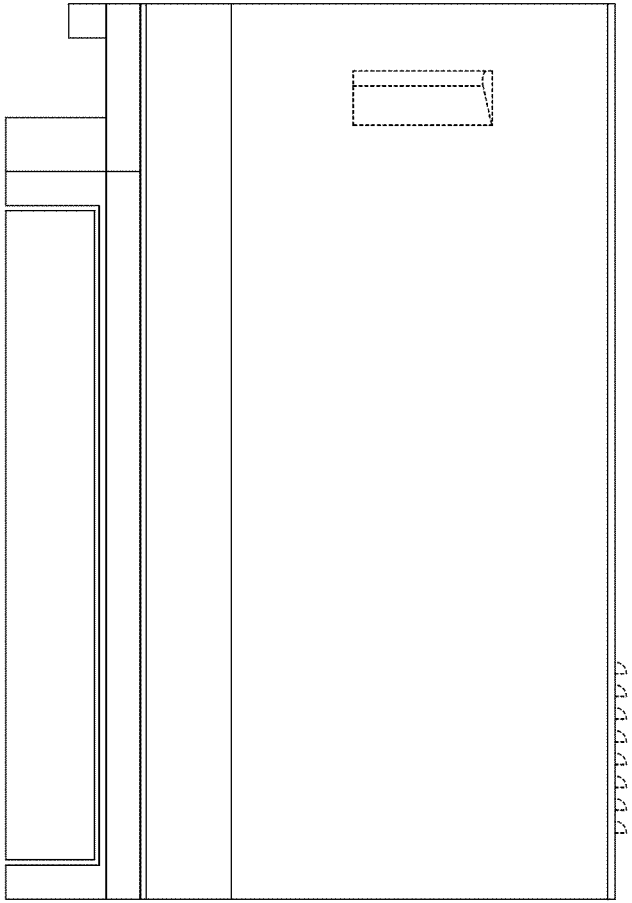
Figure 71:
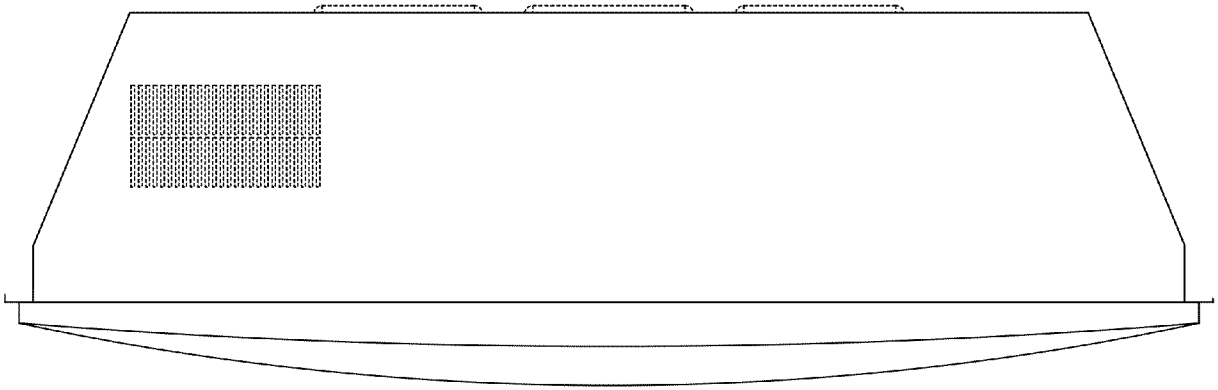
Figure 72:
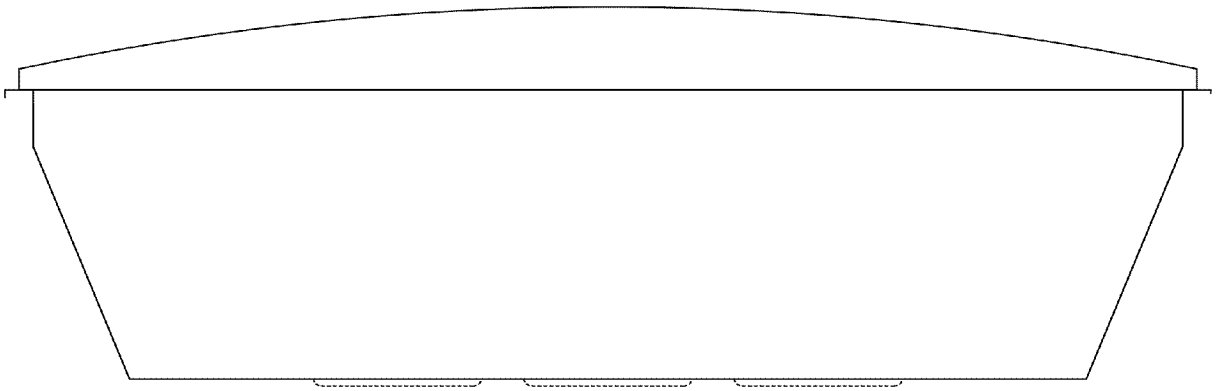
Figure 73:
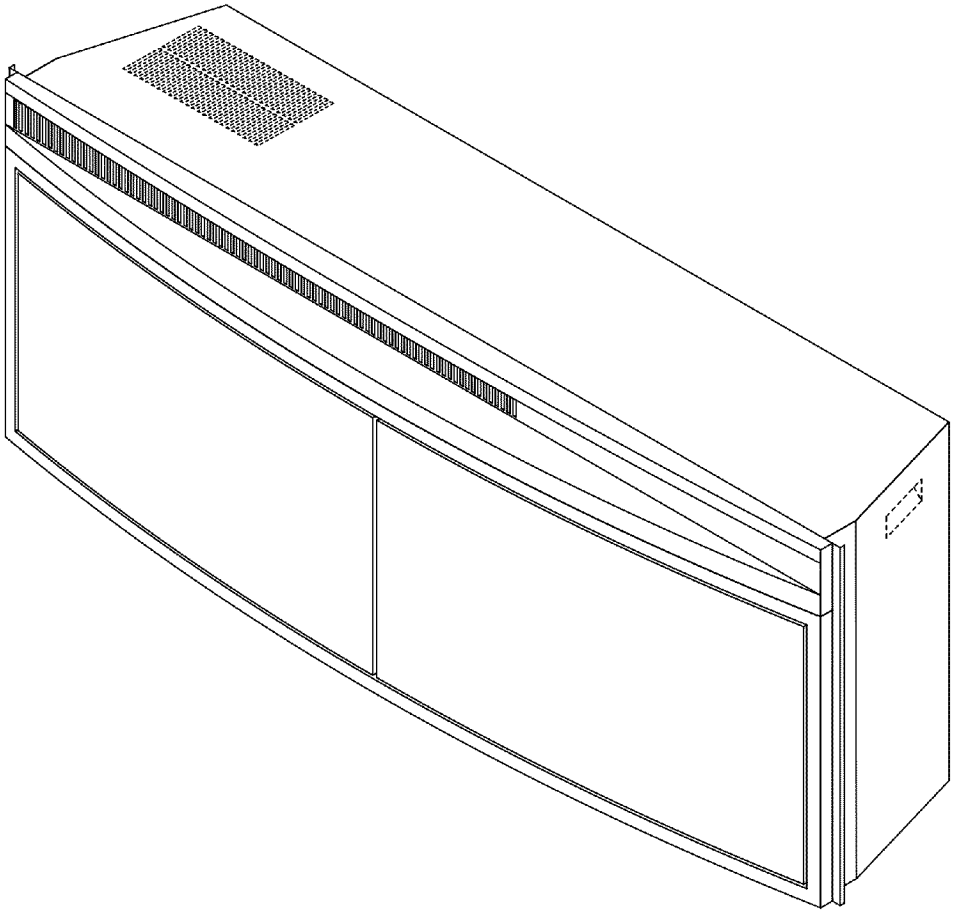
Figure 74:
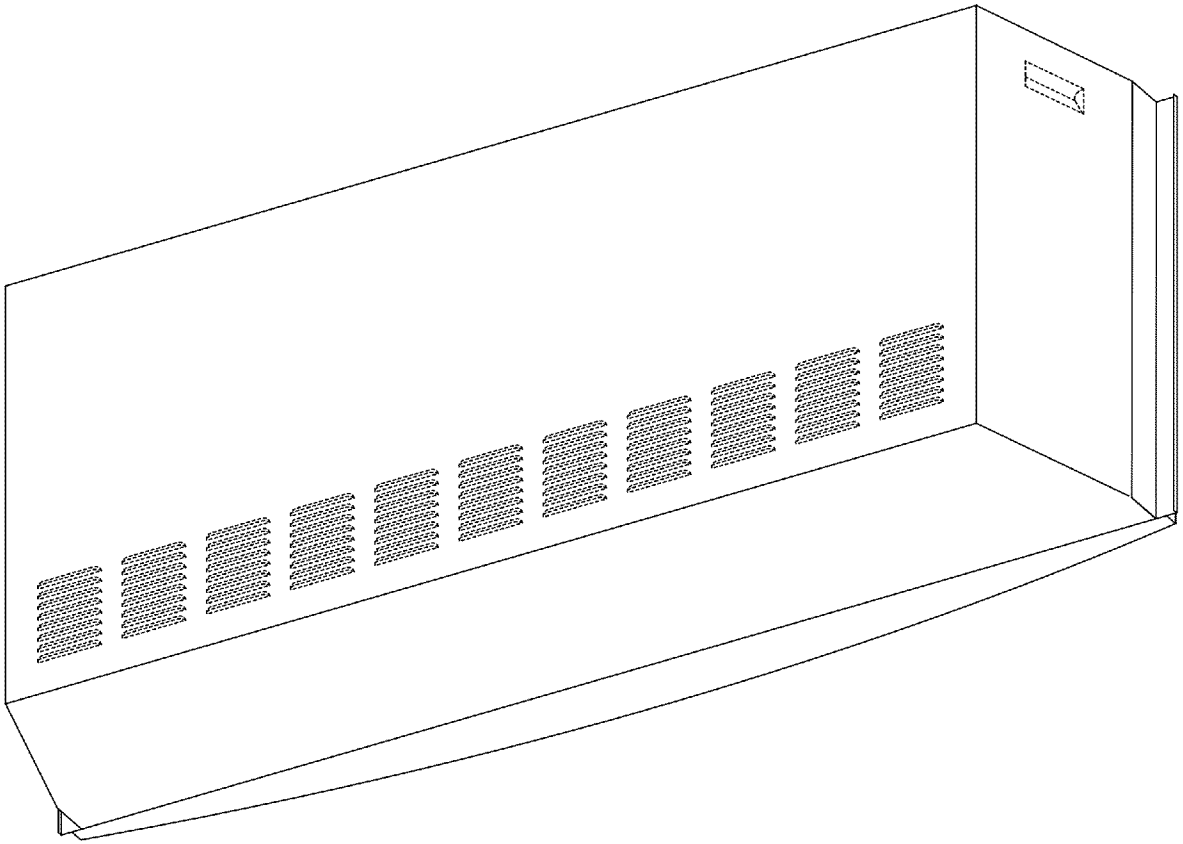
Figure 75:
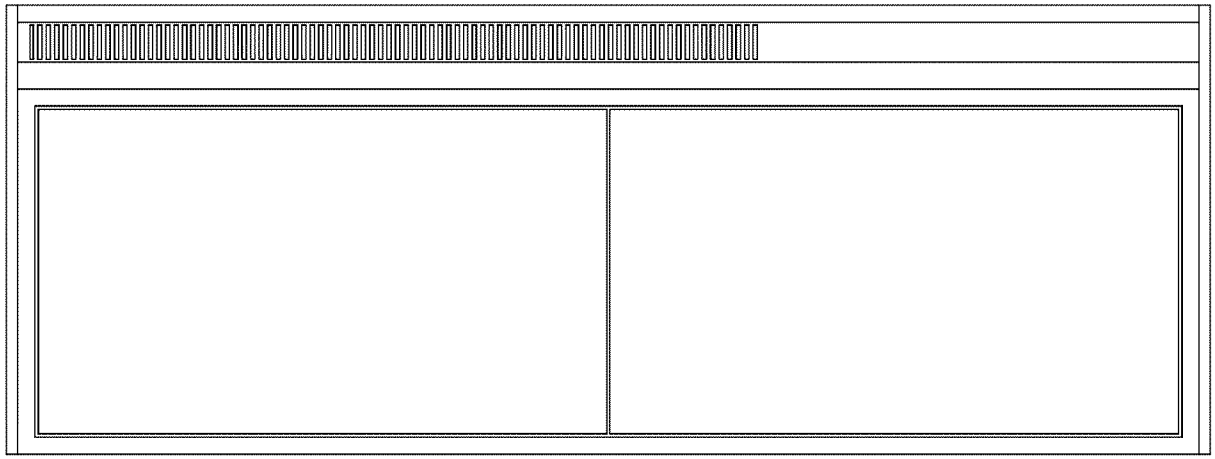
Figure 76:
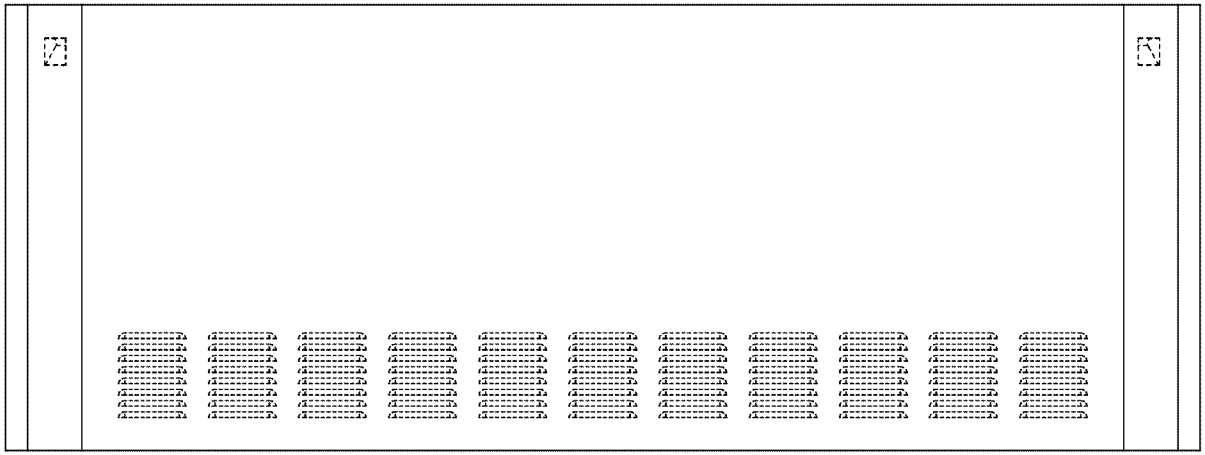
Figure 77:
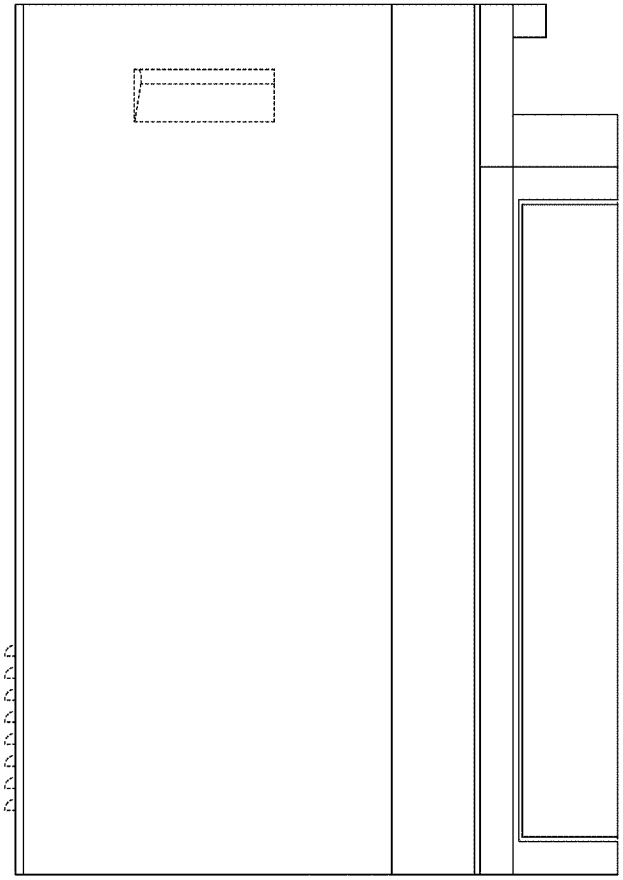
Figure 78:
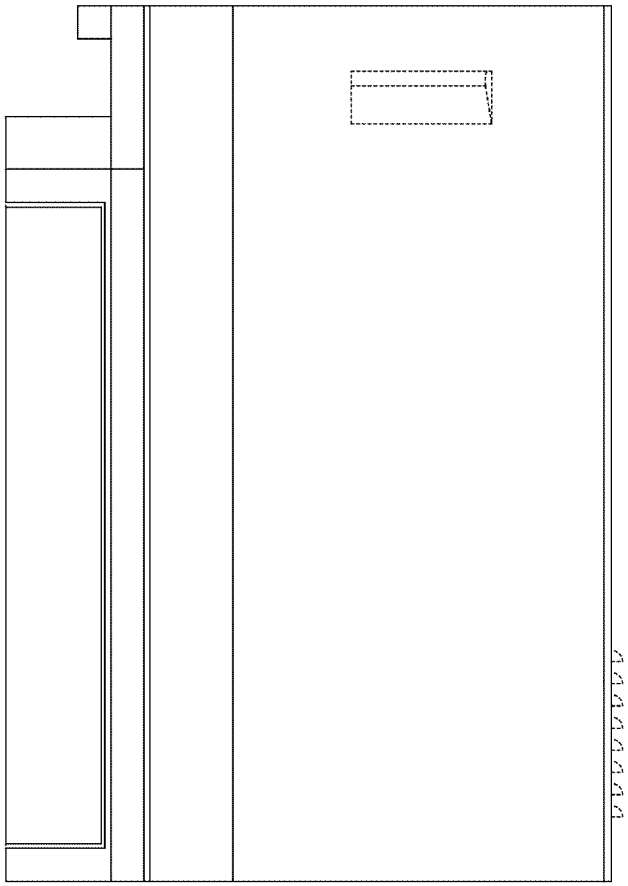
Figure 79:
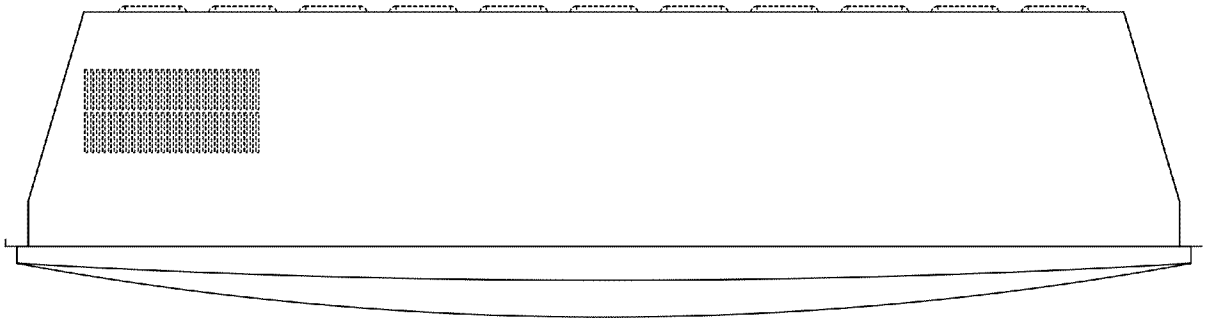
Figure 80:
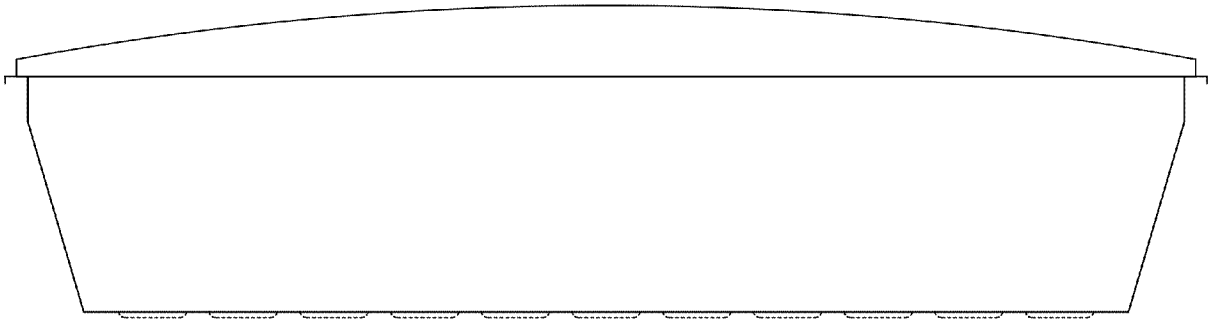

Matter enclosed in heavy brackets [ ] appears in the original patent but forms no part of this reissue; matter printed in italics indicates the additions made by reissue.

CANCELLED

CANCELLED

CANCELLED

CANCELLED

CANCELLED

CANCELLED

CANCELLED

CANCELLED

AMENDED

AMENDED

AMENDED

AMENDED

AMENDED

AMENDED

AMENDED

AMENDED

AMENDED

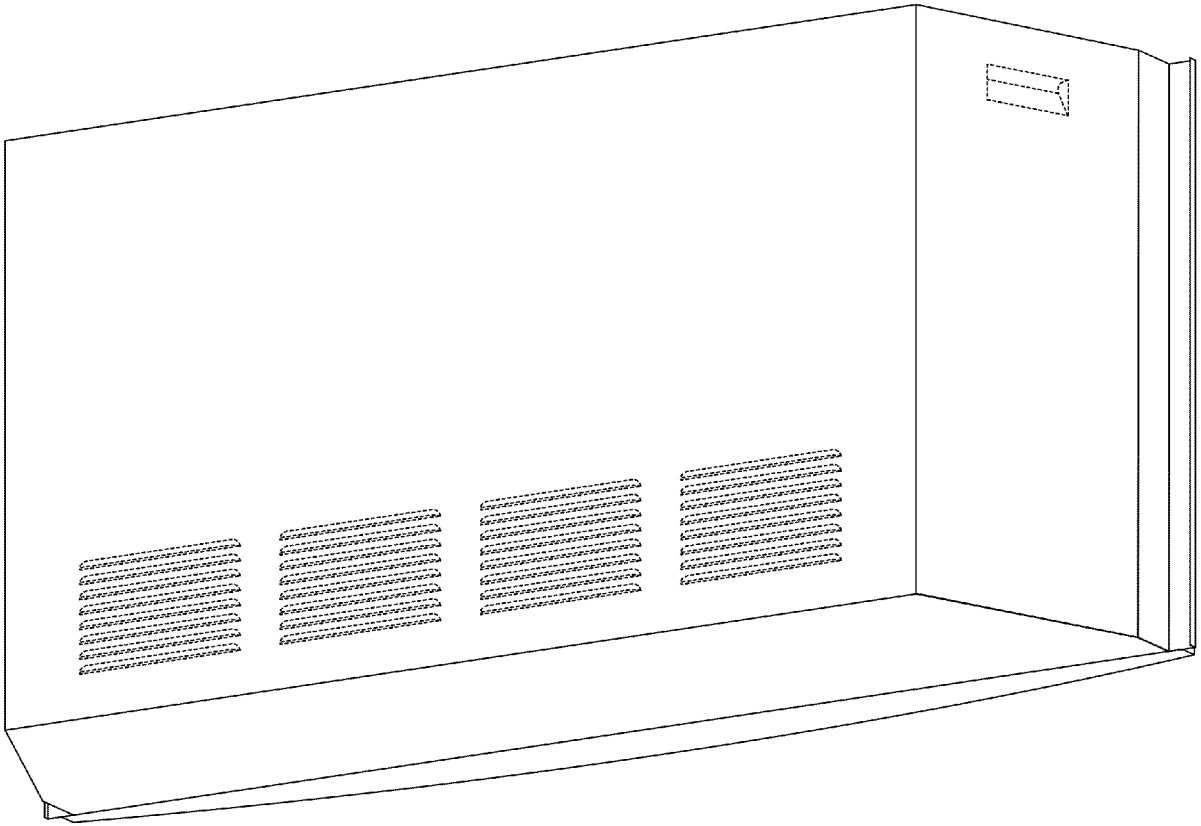
AMENDED
FIG.26

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED

AMENDED